(12) United States Patent
Ide et al.

(10) Patent No.: US 7,752,257 B2
(45) Date of Patent: Jul. 6, 2010

(54) INFORMATION PROVIDING METHOD, INFORMATION PROVIDING SYSTEM, AND INFORMATION SERVER APPARATUS

(75) Inventors: Tsuyoshi Ide, Kanagawa (JP); Hiroshi Udagawa, Tokyo (JP); Chizuru Makita, Tokyo (JP); Ichiro Ujiie, Kanagawa (JP); Masato Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1995 days.

(21) Appl. No.: 10/477,970

(22) PCT Filed: May 9, 2002

(86) PCT No.: PCT/JP02/04534
§ 371 (c)(1),
(2), (4) Date: Nov. 17, 2003

(87) PCT Pub. No.: WO02/095595
PCT Pub. Date: Nov. 28, 2002

(65) Prior Publication Data
US 2004/0153500 A1 Aug. 5, 2004

(30) Foreign Application Priority Data
May 18, 2001 (JP) .............................. 2001-150040
May 18, 2001 (JP) .............................. 2001-150041

(51) Int. Cl.
*G06F 15/16* (2006.01)
*G06F 17/30* (2006.01)
(52) U.S. Cl. ..................... 709/203; 709/206; 709/246; 707/3; 707/10
(58) Field of Classification Search ................ 709/203, 709/206, 246; 717/168–178; 707/203
See application file for complete search history.

(56) References Cited

U.S. PATENT DOCUMENTS
5,579,087 A 11/1996 Salgado
(Continued)

FOREIGN PATENT DOCUMENTS
EP 0 851 367 7/1998
(Continued)

OTHER PUBLICATIONS

Pachet F et al.: "A combinatorial approach to content-based music selection" Proceedings of the International Conference on Multimedia Computing and Systems, Los Alamitos, CA, US, vol. 1, Jun. 7, 1999, pp. 457-462, XP002165216.
(Continued)

*Primary Examiner*—Philip J Chea
(74) *Attorney, Agent, or Firm*—Frommer Lawrence & Haug LLP; William S. Frommer; Thomas F. Presson

(57) ABSTRACT

An information serving system that includes an information device capable of setting a user identifier carrying a medium type indicating an information type the information device is compatible with and identifying an information-provided user and also capable of connection to a network. An information serving device to which the information device is connected via the network, the information serving device includes databases having recorded therein, in association with each other, user profile data indicating information to be provided correspondingly to a user identifier, and content data associated with a medium type and information genre, respectively, and a request handling computer which searches, upon request from the information device, the database for content data to acquire the content data and supplies the information device with the content data as a one of the medium type the information device is compatible with.

21 Claims, 17 Drawing Sheets

U.S. PATENT DOCUMENTS

| | | | |
|---|---|---|---|
| 5,580,177 | A | 12/1996 | Gase et al. |
| 5,717,923 | A | 2/1998 | Dedrick |
| 5,761,662 | A | 6/1998 | Dasan |
| 6,018,720 | A * | 1/2000 | Fujimoto .................... 705/26 |
| 6,035,339 | A * | 3/2000 | Agraharam et al. ......... 709/246 |
| 6,163,316 | A | 12/2000 | Killian |
| 6,785,680 | B1 * | 8/2004 | Cragun ........................ 707/10 |
| 2002/0013826 | A1 * | 1/2002 | Hughes et al. ............... 709/219 |
| 2002/0083179 | A1 * | 6/2002 | Shaw et al. .................. 709/227 |

FOREIGN PATENT DOCUMENTS

| | | |
|---|---|---|
| EP | 0 961 209 | 12/1999 |
| JP | 8-166915 | 6/1996 |
| JP | 10-124430 | 5/1998 |
| JP | 2001-92743 | 4/2001 |
| JP | 2001-125825 | 5/2001 |

OTHER PUBLICATIONS

Drury G M: "Digital Delivery—New Service Possibilities" ABU Technical Review, Asian Broadcasting Union, Kuala Lumpur, MW, No. 184, Sep. 1999, pp. 3-10, XP000901421.

Bickmore T et al: "Web Page Filtering and Re-Authoring for Mobile Users", Computer Journal, Oxford University Press Surrey, GB, vol. 42, No. 6, 1999, pp. 534-546, XP000920338.

Bickmore T W et al: "Digestor: Device-Independent Access to the World Wide Web", Computer Networks and ISDN Systems, North Holland Publishing. Amsterdam, NL, vol. 29, No. 8-13, Sep. 1997, pp. 1075-1082, XP004095305.

"Pipeline's Internet Printing System Lets the Printer Surf the Web", Hard Copy Observer, Lyra, Newton Highlands, MA, US, vol. 6, No. 9, Mar. 1997, pp. 45, 24-26, XP002935645.

* cited by examiner

FIG.2

| USER ID | PERIODICALLY DISTRIBUTED CONTENT | PERIODIC-DISTRIBUTION SCHEDULE | AD.GENRE | DESTINATION ADDRESS |
|---|---|---|---|---|

FIG.3

| CONTENT ID | INFORMATION GENRE ID | CONTENT LOCATION | MEDIUM TYPE |
|---|---|---|---|

FIG.4

| USER ID | DATE OF INFORMATION PROVISION | PROVIDED-CONTENT ID | MEDIUM TYPE |
|---|---|---|---|

| USER IDENTIFIER | PREFERENCE INFORMATION | PHONE No. | ADDRESS | DEVICE SETTING |
|---|---|---|---|---|
| 0000001 | music | 987-AAA-1234 | CCC,B CITY, A PREF. | SERVER URL ETC. |
| 0000002 | sports | 123-BBB-9876 | ABC,E CITY, D PREF. | SERVER URL ETC. |
| 0000003 | art travel | 555-CCC-5555 | KKK,H CITY, G PREF. | SERVER URL ETC. |
| ... | ... | ... | ... | ... |

FIG.11

| USER IDENTIFIER | DATA TYPE IDENTIFIER FOR INFORMATION | INFORMATION GENRE IDENTIFIER | DESTINATION USER IDENTIFIER | TITLE | INFORMATION-PROVIDING USER IDENTIFIER |
|---|---|---|---|---|---|
| 0000001 | WAVE | music | 0000001 0000003 | Live | 0000009 |
| 0000002 | JPG | sports | 0000002 | Goal Goal Goal! | 0000137 |
| 0000002 | MAIL | art | | art-catalog | 0064231 |
| ... | ... | ... | ... | ... | ... |

FIG.12

| USER IDENTIFIER | DATA OF INFORMATION HANDLING | HANDLING MODE IDENTIFIER | INFORMATION IDENTIFIER | DATA TYPE |
|---|---|---|---|---|
| 0000001 | 2000/5/28 | PUT | 0000008 | JPG |
| 0000003 | 2000/5/29 | PUT | 0000009 | HTML |
| 0000003 | 2000/5/29 | GET | 0000009 | JPG |
| 0000001 | 2000/5/29 | GET | 0000008 | JPG |
| 0000002 | 2000/5/31 | GET | 0000008 | MAIL |
| 0000003 | 2000/5/31 | PUT | 00000101 | HTML |
| 0000002 | 2000/5/31 | PUT | 00000101 | HTML |
| . . . | . . . | . . . | . . . | . . . |

FIG.13

| CONVERTER IDENTIFIER | INPUT DATA TYPE IDENTIFIER | OUTPUT DATA TYPE IDENTIFIER |
|---|---|---|
| JpgToHtml.exe | JPG | HTML |
| MailToHtml.exe | MAIL | HTML |
| WaveToMP3.exe | WAVE | MP3 |
| . . . | . . . | . . . |

FIG.14

INFORMATION PROVIDING METHOD, INFORMATION PROVIDING SYSTEM, AND INFORMATION SERVER APPARATUS

TECHNICAL FIELD

The present invention relates to an information providing method, information providing system and an information serving device, destined form providing information from an information server in the Internet to user terminals.

BACKGROUND ART

Recently, the Internet based on TCP/IP (Telecommunications Protocol Internet Protocol) has rapidly been prevailing. There have been built various types of information providing systems. Each of them provides information from an information server via WWW (World Wide Web), a global information communications system.

For printing out a desired one of images available on the Internet, an image file including the image is acquired as digital data to a personal computer or the like, the digital data in the acquired image file is converted into raster data, printing raw data including a printer control code written in a predetermined format and to which a printer used with the personal computer is generated from the raster data, and the printing raw data thus generated is sent to the printer.

Although there is a great amount of information provided availably on the Internet, the acquisition of such information is limited to about two methods: viewing via a browser and reception via E-mail (electronic mail), television-related information cannot be acquired by any TV receiver, and CD (compact disk)-related information cannot be acquired by any CD player. Namely, a separate device for access to the Internet is always required in addition to the media inherently used for viewing or acquiring the information, such as the TV receiver, CD player and the like.

The above limited acquisition of the information available on the Internet is very inefficient, and digital data in a content to be printed out will be stored in the personal computer. Namely, the digital information will possibly be copied illegally.

On the other hand, even if the Internet has been prevalent more and more, the information provider, especially, an advertiser or sponsor, could not limit his advertising media to the Internet with ceasing to provide the information via the conventional other media. The advertiser or sponsor should still produce many contents for provision over many media and provide the information via many routes. That is, the Internet is an extra medium add to the conventional media.

Also, since the TV receiver, CD player or the like has no input unit like a keyboard, it is extremely difficult to set user identifiers and passwords necessary when using the Internet, which has been an obstacle for a user wanting to use the Internet.

Further, information provision and sales marketing over the Internet will have an inclination to be weighted for some people able to access the Internet.

On the other hand, to print out a desired one of images available on the Internet, an image file including the image is download to a personal computer or the like and provisionally stored there, and thus digital data in the image file is easily copied illegally.

Accordingly, the present invention has a primary object to overcome the above-mentioned drawbacks of the related art by enabling an information device without any complicated input unit to acquire information from on the Internet for utilization thereof and also an information provider to provide information without so much awareness of the type of a device used by a user who acquires information (which will be referred to as "information acquirer" or, "information-provided user" hereinafter wherever appropriate) to acquire the information.

The present invention has also a secondary object to provide a method, system and apparatus, destined for providing information with the capability of preventing illegal copy of images and the like availably existent on the Internet.

DISCLOSURE OF THE INVENTION

The above first object can be attained by providing a method of providing information, via a network, to an information device capable of setting a user identifier carrying a medium type indicating an information type matching the information device and identifying an information-provided user, and also capable of connection to the network, the method including, according to the present invention, the steps of issuing a user identifier to a user who makes a contract for an information service, and entering and storing user profile data indicating information to be provided correspondingly to the user identifier; searching, upon request from the information device, a database having recorded therein content data associated with a medium type and information genre to acquire the information to be provided based on the user profile data; and providing the information as content data of the medium type matching the information device to the information device via the network.

Also, the above first object can be attained by providing a method of providing information, via a network, to an information device capable of setting a user identifier carrying a data type indicating an information type matching the information device and identifying an information-provided user, and also capable of connection to the network, the method including, according to the present invention, the steps of issuing a user identifier to a user who makes a contract for an information service, and entering and storing user profile data indicating information to be provided correspondingly to the user identifier; searching, upon request from the information device, a database having recorded therein content data associated with a medium type and information genre to acquire, from the database, information to be provided based on the user profile data; and converting the information into content data of the data type matching the information device according to data conversion information for conversion of information in data type from one into another, and providing the information to the information device.

Also, the above first object can be attained by providing an information providing system including, according to the present invention, an information device capable of setting a user identifier carrying a medium type indicating an information type matching the information device and identifying an information-provided user, and also capable of connection to a network; and an information serving device to which the information device is connected via the network, the information serving device including a database having recorded therein user profile data indicating information to be served correspondingly to the user identifier and content data associated with a medium type and information genre; and a request handling means for searching, upon request from the information device, the database to acquire the content data from the database and supplying the information device with the content data as content data of a medium type matching the information device.

Also, the above first object can be attained by providing an information providing system including, according to the present invention, an information device capable of setting a user identifier carrying a data type indicating an information type matching the information device and identifying an information-provided user, and also capable of connection to a network; and an information serving device to which the information device is connected via the network, the information serving device including a database having recorded therein user profile data indicating information to be served correspondingly to the user identifier for a user having made a contract for information service, content data associated with a medium type and information genre and data conversion information for conversion of information in data type from one into another; a data converting means for converting content data in data type from one into another; and a request handling means for searching, upon request from the information device, the database having recorded therein the content data associated with the data type and information genre to acquire, from the database, information to be provided based on the user profile data, converting the information by the data converting means according to the data conversion information into content data of the data type matching the information device, and providing the information to the information device.

Also the above first object can be attained by providing an information serving device to which there is connected via a network an information device capable of setting a user identifier carrying a medium type indicating an information type matching the information device and identifying an information-provided user, and also capable of connection to a network is connected via the network, the information serving device including, according to the present invention, a database having recorded therein user profile data indicating information to be served correspondingly to the user identifier and content data associated with a medium type and information genre; and a request handling means for searching, upon request from the information device, the database to acquire the content data from the database and supplying the information device with the content data as content data of a medium type matching the information device.

Also the above first object can be attained by providing an information serving device to which there is connected via a network an information device capable of setting a user identifier carrying a data type indicating an information type matching the information device and identifying an information-provided user, and also capable of connection to a network is connected via the network, the information serving device including, according to the present invention, a database having recorded therein user profile data indicating information to be served correspondingly to the user identifier for a user having made a contract for information service, content data associated with a medium type and information genre and data conversion information for conversion of information in data type from one into another; a data converting means for converting content data in data type from one into another; and a request handling means for searching, upon request from the information device, the database having recorded therein the content data associated with the data type and information genre to acquire, from the database, information to be provided based on the user profile data, converting the information by the data converting means according to the data conversion information into content data of the data type matching the information device, and providing the information to the information device.

The above second object can be attained by providing an information providing method including, according to the present invention, the steps of generating, when printing out data available on the Internet, printing raw data including raster data in a to-be-printed image and printer control command at a data sending side on the Internet; and sending the printing raw data thus generated.

Also the above second object can be attained by providing an information providing system including an information serving device and user-side printer both connected thereto via the Internet, the information serving device operating to search, upon print request from the user-side printer, a database for data corresponding to the print request; generate printing raw data including raster data in a to-be-printed image in the data read from the database and printer control command; and sending the printing raw data thus generated via the Internet.

Also the above second object can be attained by providing an information serving device operating to search, upon print request from the user-side printer, a database for data corresponding to the print request; generate printing raw data including raster data in a to be-printed image in the data read from the database and printer control command; and sending the printing raw data thus generated via the Internet.

BRIEF DESCRIPTION OF THE DRAWINGS

FIG. 2 schematically illustrates information included in user information in the information providing system in FIG. 1.

FIG. 3 schematically illustrates information included in content information in the information providing system in FIG. 1.

FIG. 4 schematically illustrates information included in a history of information provision in the information providing system in FIG. 1.

FIG. 11 schematically illustrates information included in user information in the information providing system in FIG. 10.

FIG. 12 schematically illustrates information included in content information in the information providing system in FIG. 10.

FIG. 13 schematically illustrates information included in a history of information provision in the information providing system in FIG. 10.

FIG. 14 schematically illustrates information included in data conversion information in the information providing system in FIG. 10.

BEST MODE FOR CARRYING OUT THE INVENTION

The present invention will be described in detail herebelow concerning the embodiments thereof with reference to the accompanying drawings.

Figure 1:
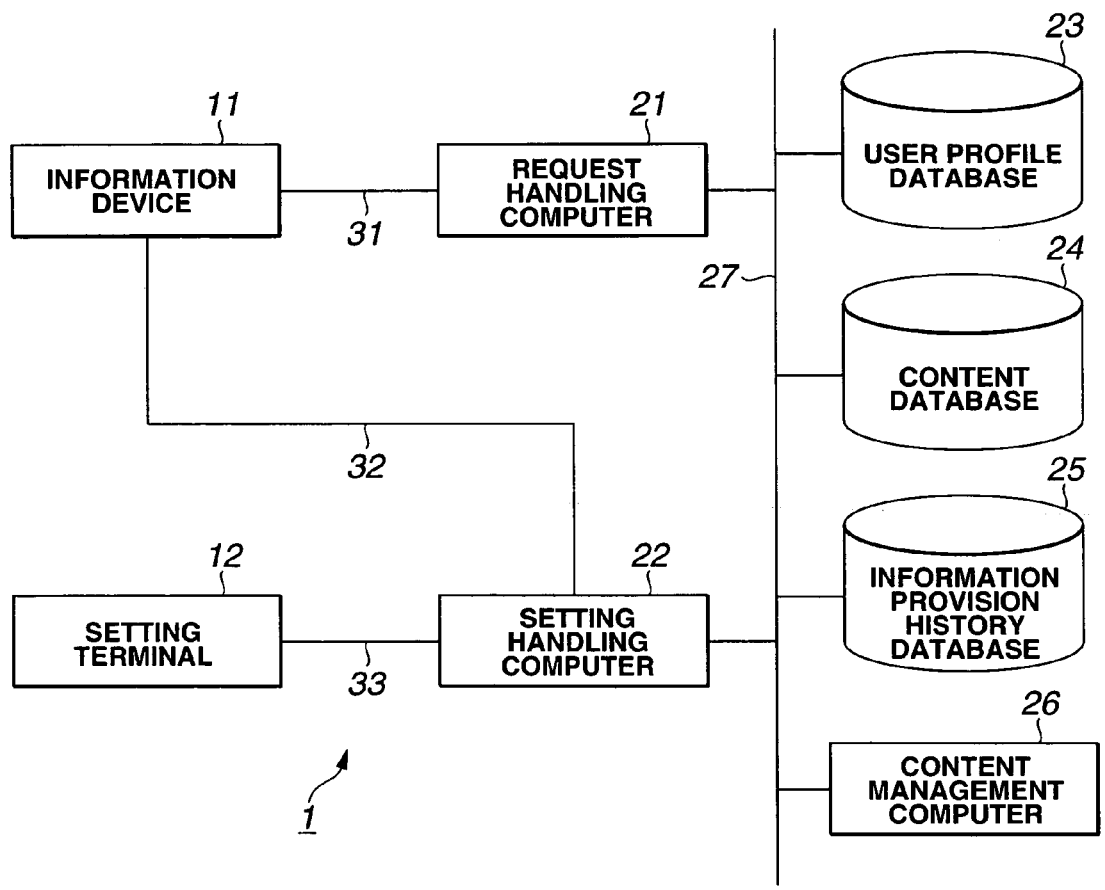
FIG. 1 is a block diagram of a first embodiment of the information providing system according to the present invention.

Referring now to FIG. 1, there is illustrated in the form of a block diagram the first embodiment of the information providing system according to the present invention. The information providing system is generally indicated with a reference number 1.

As shown in FIG. 1, the information providing system 1 includes a user-side information device 11 and setting terminal 12, a server-side request handling computer 21, setting handling computer 22, user profile database 23, content database 24, information provision history database 25 and a content management computer 26.

The user-side information device 11 is capable of providing the user with information in the form of sound, image or paper. It is connected to the server-side request handling computer 21 and setting handling computer 22 via networks 31 and 32. The information device 11 is supplied with a user ID from a user and sends the user ID to the server-side setting handling computer 22, while receiving handling mode setting information from the setting handling computer 22. Information required for connection to the setting handling computer 22 has been pre-recorded or is supplied from the user. The received handling mode setting information is stored along with the user ID in the information device 11. Also, the information device 11 has pre-stored therein types of information the information device 11 can provide (sound, image, paper or the like; will be referred to as "medium type" hereinafter). The information device 11 having handling mode setting information and user ID stored therein sends a user ID and medium type to the server-side request processing computer 21 at a designated time if a periodic information acquisition has been designated in the handling mode setting information, acquires information of an entered genre from the request handling computer 21 in a form corresponding to the medium type and provides the information to the user. Also, the information device 11 is provided with a user interface allowing the user to selectively acquire desired information.

The user-side setting terminal 12 has a WWW browser, for example, installed therein. It is connected to the server-side setting handling computer 22 via a network 33 such as Internet, displays a screen provided by the server-side setting handling computer 22, accepts input data and sends the input data to the setting handling computer 22. Then, the setting terminal 12 presents, to the user, a user ID which will be sent subsequently from the setting handling computer 22. The setting terminal 12 may be an independent device but it may be a one integral with the information device 11. In the latter case, the information device 11 can conveniently acquire information, enter and change settings.

The server-side request handling computer 21 is connected to the user profile database 23, content database 24 and information provision history database 25 via a network 27, and also to the user-side information device 11 via the network 31. The request handling computer 21 can receive data such as a user ID, media type, information genre and content ID. Also, the request handling computer 21 can search the user profile database 23 to acquire an entered information genre and content ID corresponding to the user ID. Also, the request handling computer 21 searches the content database 24 according to the information genre, content ID and a medium type designated by the information device 11 to acquire a content, converts the content into a form corresponding to the medium type if necessary, and sends the converted content to the information device 11. Further, the request handling computer 21 can write a history into the information provision history database 25 each time information is provided to the user.

The server-side setting handling computer 22 is connected to the user profile database 23 and content database 24 via the network 27, and connected to the user-side information device 11 and setting terminal 12 via the networks 31 and 32, respectively. The setting handling computer 22 provides a setting screen to the user-side setting terminal 12, writes an input content supplied at the setting terminal 12 into the user profile database 23, and issues a user ID. When providing a setting screen, the setting handling computer 22 searches the content database 24, and generates and provides an information genres list and contents list. The user ID may be determined by either the setting handling computer 22 or by the user profile database 23. Also, receiving a user ID from the user-side information device 11, the setting handling computer 22 can search the user profile database 23 to acquire handling mode setting information for the information device 11, and transfer the information to the information device 11.

Also, the server-side user profile database 23 has user information recorded therein, and can provide information hit by a search requested. Also, the server-side user profile database 23 can record user information upon request.

User information recorded to the user profile database 23 will be described herebelow:

As shown in FIG. 2, the user information includes at least user ID, periodically distributed content, periodic-distribution schedule, advertisement genre and connection-destination address associated with each other.

The "user ID" is an identifier by a number, symbol or the like assigned to each user for unique identification of the latter.

The "periodically distributed content" is an information genre ID or content ID entered for a user having an associated user ID and who desires a periodic content distribution. The "information genre ID" and "content ID" will be discussed later.

The "periodic-distribution schedule" is time information such as date, day of week, time and the like of a periodic distribution entered for a user having an associated user ID and who desires a periodic content distribution.

The "advertisement genre" is entered as an information genre in which a user having an associated user ID is interested and which is used to determine information to be inserted as an advertisement at the time of information provision.

The "connection-destination address" is an identifier, on the networks, of the request handling computer 21 to which a user having an associated user ID makes connection when he or she requests information provision. This identifier is determined by a user's address and a genre or the like of information which, the user desires, is provided.

Also, the server-side content database 24 has content information recorded therein, and can provide information hit by a search requested. Also, the content database 24 can record content information upon request.

Content information recorded to the content database 24 will be discussed herebelow:

The content information includes at least content ID, information genre ID, content location and medium type associated with each other as shown in FIG. 3.

The "content ID" is an identifier by a number, symbol or the like for unique identification of a content.

The "information genre ID" is an identifier by a number, symbol or the like indicating the type of a content having an associated content ID.

The "content location" is an identifier by a number, symbol or the like indicating a location where a content is stored in association with other data.

The "medium type" is an identifier by a number, symbol or the like indicating of which type the device capable of outputting a content is.

Note that a content may not be stored in a location inside the system but may be stored in an external web site. In the latter case, more contents can be provided.

Also, the server-side information provision history database 25 has an information provision history recorded therein, and can provide information hit by a search requested. Also, the information provision history database 25 can record an information provision history upon request.

Information provision history recorded to the information provision history database 25 will be discussed herebelow:

An information provision history includes at least user ID, date of information provision, ID for a content having been provided and medium type as shown in FIG. 4.

The "user ID" is any of user IDs recorded in the user profile database 23, and it is an identifier by a number, symbol or the like for identification of a user having requested information service.

The "date of information provision" is a date when information service has been made.

The "provided-content ID" is any of content IDs recorded in the content database 24, and it is an identifier by a number, symbol or the like for identification of a content having been provided to the user.

The "medium type" is an identifier by a number, symbol or the like indicating of which type the information having been provided is.

Further, the server-side content management computer 26 is connected to the content database 24 via the network 27, and can control the content database 24 to add and delete a content.

Note that although the networks 31, 32 and 33 in the information providing system 1 shown in FIG. 1 are illustrated and explained as different ones, they may be identical to each other or may be the Internet. Also, if the server-side request handling computer 21, setting handling computer 22 and content management computer 26 are connected to the databases they need, respectively, they may not be connected to one another.

Figure 5:
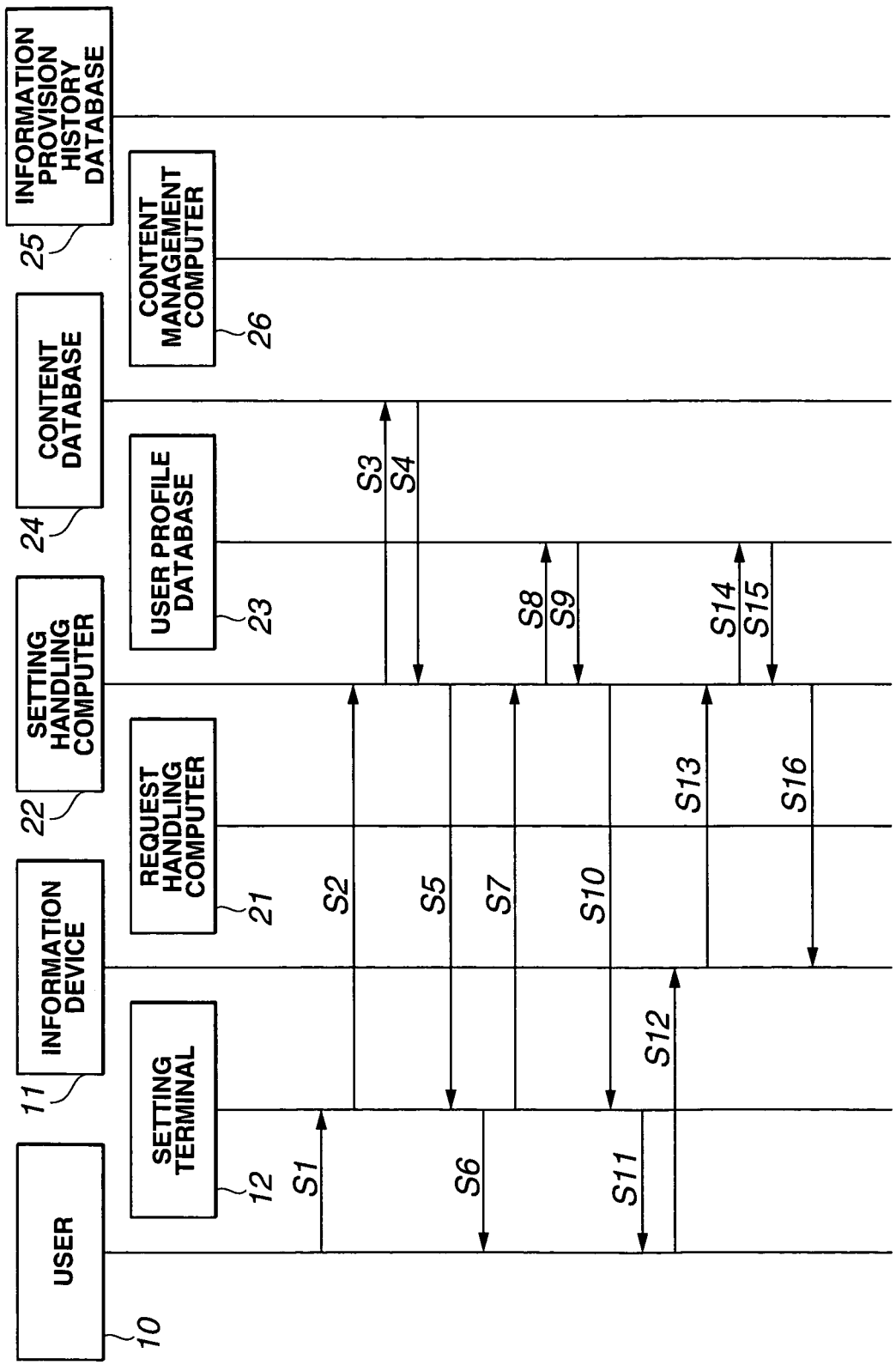
FIG. 5 diagrammatically illustrates a flow of operations including from registration of user information up to setting and storage of the user information in an information device in the information providing system in FIG. 1.

The information providing system 1 constructed as above functions as will be described below:

To make a sequence of operations up to entry of user information and setting and storage of the user information in the information device 11, the information providing system 1 will go through steps S1 to S16 shown in FIG. 5.

Namely, first in step S1, a user 10 operates his or her setting terminal 12 to make a request for start of information entry.

In step S2, the setting terminal 12 is connected to the setting handling computer 22 for requesting one or both of an information genres list and contents list.

In step S3, the setting handling computer 22 requests the content database 24 for generation of the information genres list and contents list.

In step S4, the content database 24 generates the information genres list and contents list and sends them to the setting handling computer 22.

In step S5, the setting handling computer 22 sends the received information genres list and contents list to the setting terminal 12.

In step S6, the setting terminal 12 presents the received information genres list and contents list to the user 10, and accepts necessary inputs.

In step S7, the setting terminal 12 sends the supplied inputs to the setting handling computer 22.

In step S8, the setting handling computer 22 records the information sent from the setting terminal 12 to the user profile database 23.

In step S9, the user profile database 23 generates a unique ID and records it as a user ID when recording to the database, and sends the user ID to the setting handling computer 22.

In step S10, the setting handling computer 22 sends the user ID to the setting terminal 12.

In step S11, the setting terminal 12 transmits the user ID to the user 10. The user ID can be transmitted by various methods such as screen display, printing, write to a recording medium, etc.

In step S12, the user 10 having received the user ID will supply the received user ID to the information device 11.

In step S13, the information device 11 sends the supplied user ID to the setting handling computer 22 to request setting of a handling mode.

In step S14, the setting handling computer 22 searches the user profile database 23 to acquire handling mode setting information associated with the received user ID. The handling mode setting information includes at least periodic-distribution schedule and connection-destination address.

In step S15, the setting handling computer 22 sends the acquired handling mode setting to the information device 11.

In step S16, the information device 11 stores, along with the user ID, the handling mode setting information received from the setting handling computer 22.

Note that although in the above procedure, the user 10 operates the setting terminal 12 and supplies a user ID to the information device 11, this operation may be done for him by a clerk of the dealer or manufacturer of the information device 11 or an information provider, which will advantageously reduce the troublesome labor of the user 10.

Figure 6:
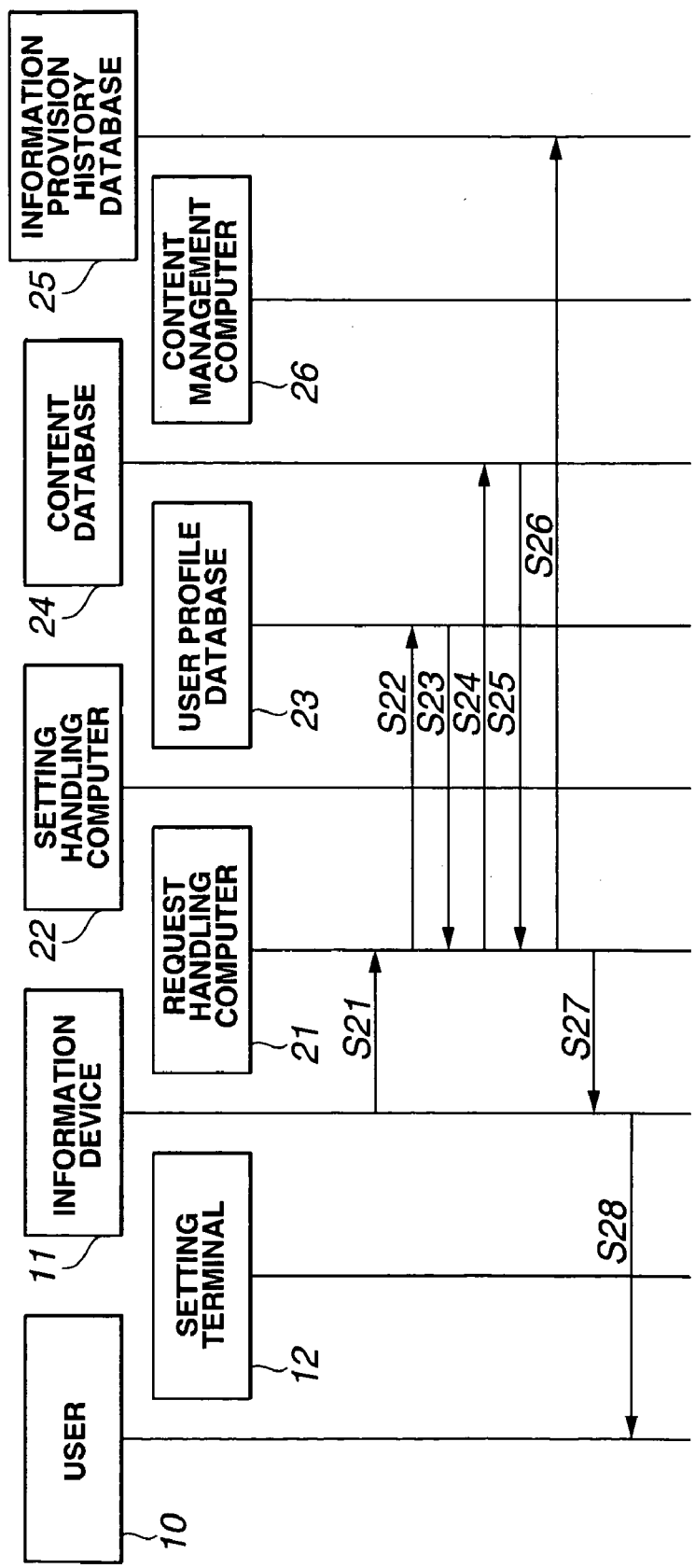
FIG. 6 diagrammatically illustrates a flow of operations made for periodic information provision in the information providing system in FIG. 1.

Also, to make periodic distribution of information, the information providing system 1 will go through steps S21 to S28 shown in FIG. 6.

Namely, first in step S21, the information device 11 having the handling mode setting information stored therein as above will request, at a time designated in the stored periodic-distribution schedule, the request handling computer 21 designed as a connection-destination address to distribute information. At this time, the information device 11 sends both a user ID stored therein and medium type information prerecorded therein.

In step S22, the request handling computer 21 searches the user profile database 23 according to the received user ID, and in step S23, it will acquire a periodically distributed content associated with the user ID, and information indicating the type of advertisement genre.

In step S24, the request handling computer 21 searches the content database 24 according to the acquired periodically distributed content, information indicating the advertisement genre type and medium type of the information device 11, and in step S25, it will acquire a provided content and an advertisement content provided in addition to the content. At this time, the contents are converted into a form more adaptive to the medium type of the information device 11 if necessary.

Further in step S26, the request handling computer 21 will record a user ID, date of information provision, provided-content ID and medium type to the information provision history database 25.

In step S27, the request handling computer 21 sends the content data to the information device 11.

In step S28, the information device 11 supplies the received content data to the user 10.

Figure 7:
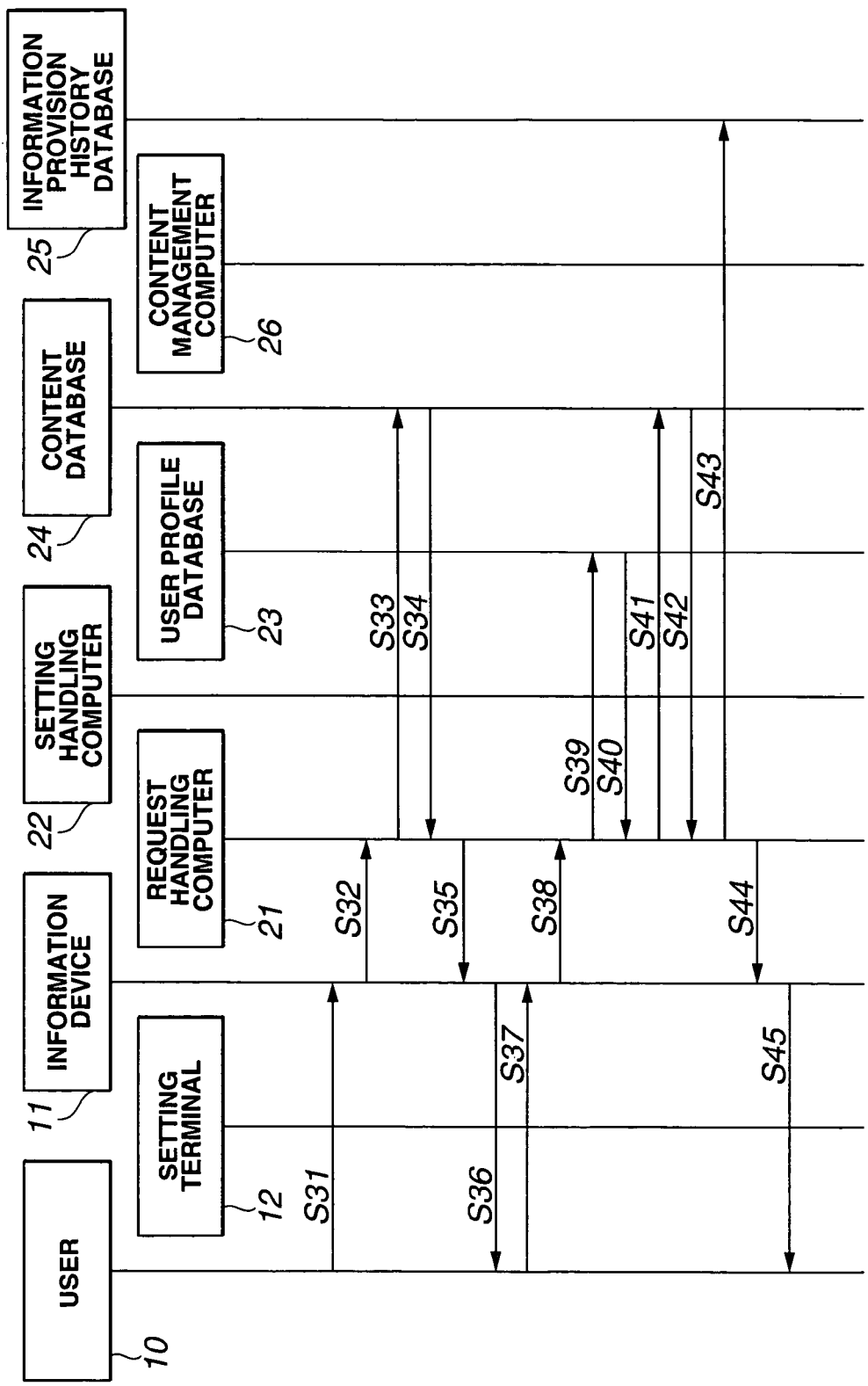
FIG. 7 diagrammatically illustrates a flow of operations made for user's active acquisition of information by designating the information in the information providing system in FIG. 1.

Also, for the user to acquire information by actively designating the information, the information providing system 1 will go through steps S31 to S45 shown in FIG. 7.

Namely, in step S31, the user 10 operates the information device 11 to make a request for provision of information.

In step S32, the information device 11 requests the request handling computer 21 for an information genres list and contents list.

In step S33, the request handling computer 21 requests the content database 24 to generate the information genres list and contents list.

In step S34, the content database 24 generates the information genres list and contents list and sends them to the request handling computer 21.

In step S35, the request handling computer 21 sends the information genres list and contents list sent from the content database 24 to the information device 11.

In step S36, the information device 11 presents, to the user 10, the information genres list and contents list received from the request handling computer 21, and accepts a selection made by the user in step S37.

In step S38, the information device 11 sends a user ID and medium type stored in an input result of selection to the request handling computer 21.

In step S39, the request handling computer 21 searches the user profile database 23 for an advertisement genre associated with the received user ID, and acquires the advertisement genre from the user profile data base 23 in step S40.

Further in step S41, the request handling computer 21 searches the content database 24 according to the result of user's selection, advertisement genre associated with the user ID and medium type of the information device 11, received from the information device 11, and acquires, from the content data base 24, a content to be provided and advertisement content to be added to the content in step S42. At this time, the contents are converted into a form more adaptive to the medium type of the information device 11 if necessary.

Also in step S43, the request handling computer 21 records the user ID, date of information provision, provided-content ID and medium type to the information provision history database 25.

Then in step S44, the request handling computer 21 sends content data to the information device 11.

In step S45, the information device 11 supplies the user 10 with the content data received from the request handling computer 21.

Note that in case the information genres list and contents list include no information the user desires, the information device 11 may send a keyword to the request handling computer 21 or content database 24, instead of any result of user's selection it sends to the request handling computer 21 as above, to make a keyword search by the request handling computer 21 or content database 24 and takes, as a content to be provided, data hit by the keyword.

Figure 8:
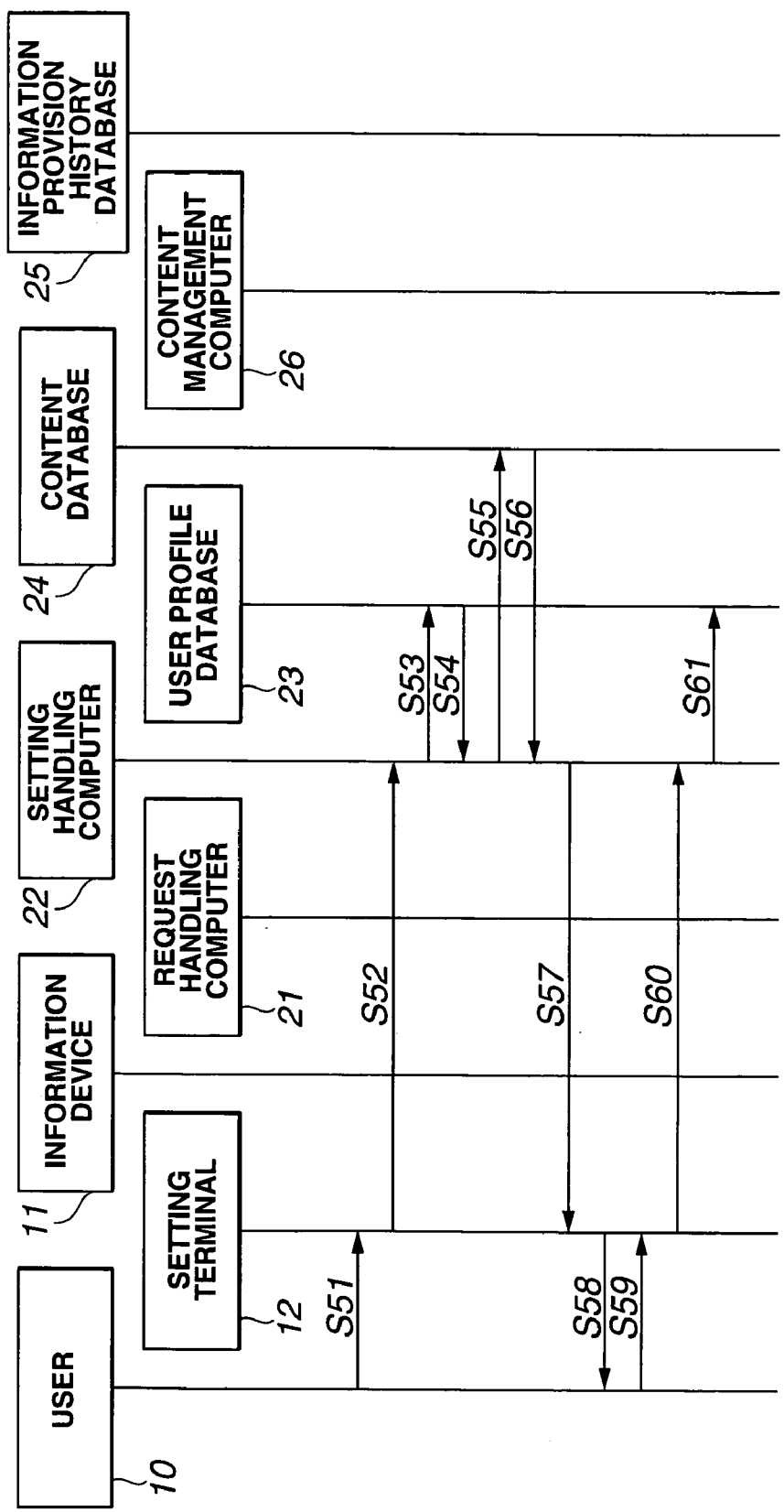
FIG. 8 diagrammatically illustrates a flow of operations made for changing entered information in the information providing system in FIG. 1.

Also, to change entered information, the information providing system 1 will go through steps S51 to S61 shown in FIG. 8.

That is, in step S51, the user 10 makes a request for changing the entered information by supplying a user ID to the setting terminal 12.

In step S52, the setting terminal 12 sends the supplied user ID to the setting handling computer 22 to make a request for current settings, information genres list and contents list.

In step S53, the setting handling computer 22 searches the user profile database 23 according to the user ID received from the setting terminal 12, and acquires user information associated with the user ID from the user profile database 23 in step S54.

Further in step S55, the setting handling computer 22 requests the content database 24 to generate an information genres list and contents list.

In step S56, the content database 24 generates an information genres list and contents list and sends them to the setting handling computer 22.

In step S57, the setting handling computer 22 sends, to the setting terminal 12, the current settings, information genres list and contents list acquired from the contents database 24.

In step S58, the setting terminal 12 presents, to the user 10, the current settings, information genres list and contents list sent from the setting handling computer 22.

In step S59, the user 10 make input of new settings, and the setting terminal 12 sends the supplied settings to the setting handling computer 22 in step S60.

In step S61, the setting handling computer 22 records the settings sent from the information device 11 to the user profile database 23.

Note that if the information device 11 has the function of the setting terminal 12, the setting terminal 12 can be operated by the information device 11, which will lead to a reduced number of necessary devices in the information providing system 1 and an improved efficiency of the operations.

Figure 9:
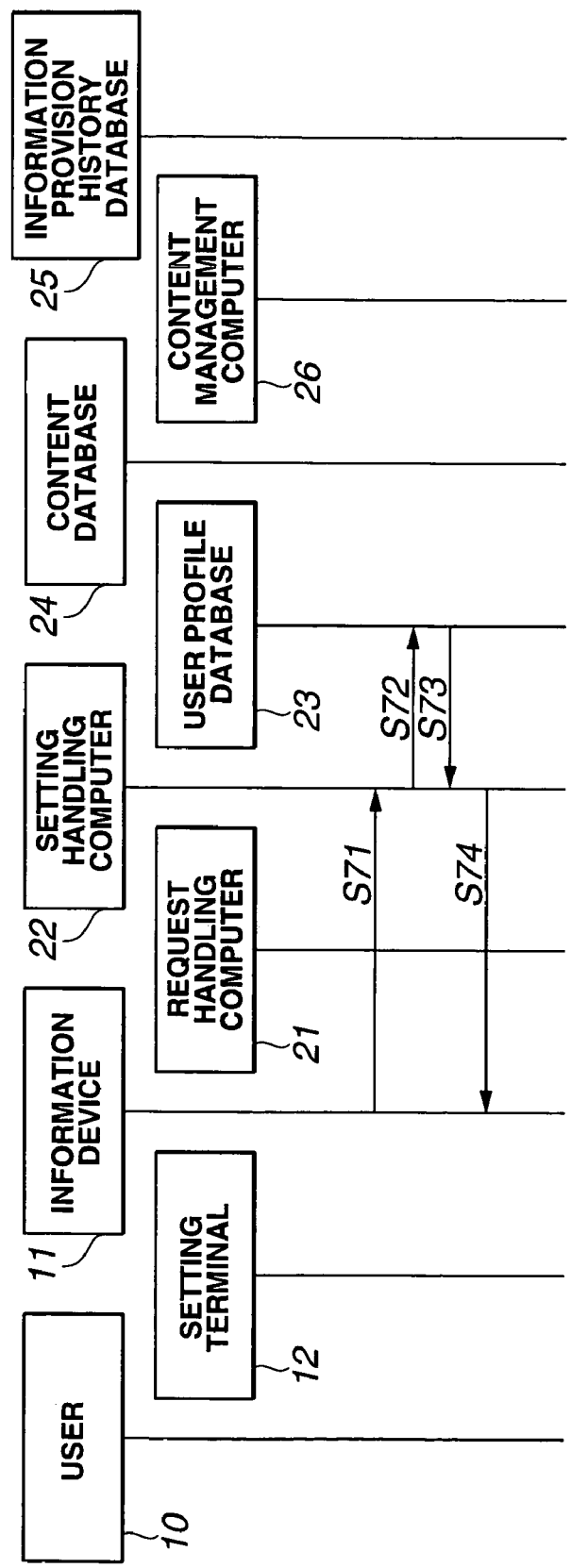
FIG. 9 diagrammatically illustrates a flow of operations made for updating settings of the information device in the information providing system in FIG. 1.

Also, to update settings of the information device 11, the information providing system 1 will go through steps S71 to S74 shown in FIG. 9.

That is, when the information device 11 issues a request for updating of settings to the setting handling computer 22 in step S71, the setting handling computer 22 searches the user profile database 23 in step S72 to check for any change of the settings.

In next step S73, the setting handling computer 22 acquires information about a new setting, if any, from the user profile database 23. Then in step S74, the setting handling computer 22 transfers the information about the new setting acquired from the user profile database 23 to the information device 11 where it will be stored.

The above updating of settings is explicitly done by operating the information device 11. However, it is implicitly done in the process of information acquirement in some cases. In the latter case, the request handling computer 21 works for the setting handling computer 22, which can attain a higher efficiency of the operations because the user has to do less operations.

Note that although the medium type of the information device 11 is coped with in the aforementioned information providing system 1, an information service can be established fro a specific medium. In this case, the designation of a medium type may be omitted from the sequence of operations on the assumption that a medium type has implicitly been designated.

In the information providing system 1, a user identifier is issued to a user or consumer who makes a contract for information service. In the information service contract, there are entered the genre of information to be provided at the setting terminal 12, a time when the information is to be provided, an amount of the information, etc. along with the address, name, age, profession, sexuality, etc. of the user. The information thus entered is stored in the server-side user profile database 23. The user having received the user identifier will enter the latter to the information device 11 such as a TV receiver, video tape recorder, radio receiver, a device capable of playing back a CD, MD or DVD, printer or computer game machine. At this time, the information device 11 used by the consumer is capable of connecting to the Internet 7 (which function is one of the functions necessary for implementation of the information service). The information device 11 will thus acquire necessary settings for acquiring information by sending the entered user identifier to an address, pre-stored in the information device 11, of the server-side setting handling computer 22. The information device 11 has a function to implement the information service and is sold at a relatively low price in consideration of the information service contract. In case the consumer desires a periodic information distribution, the information device 11 will automatically send a user identifier and information device type identifier to the request handling computer 21 when an information acquisition time entered at the time of the information service contract, and acquire information about an entered genre in a form matching the information device 11 for provision to the consumer. Also, in case the consumer is actively going to acquire specific information, he or she operates the information device 11 to acquire an information list from the request handling computer 21 via the Internet. The consumer selects desired information from the acquired information list, operates the information device 11 to send a result of his selection, user identifier and information device type identifier to the request handling computer 21, and thus acquires the desired information. In the information provision to the user, information designated by him as well as an advertisement of a type associated with the information will be provided to the user and an advertisement income will go to a performer of this business. At this time, a history of information provision to the user is entered in the profile database and can be used for analysis of user's preference and information provision to an advertiser.

In the information providing system 1, we can use information devices of all types as information distribution terminals on the Internet for acquisition of information available on the Internet as if we used a conventional medium. Also, the information provider can gain an advertisement income. The advertiser can limit the information providing routes. Using a system of the periodic information distribution, the advertiser can distribute an advertisement, whereby a system in which an information device can be provided to the user with a relatively low price can be applied also to an information device other than a free personal computer (PC) which has already been made available free of charge because a part or all of the cost of the PC is covered by the ad rate. Also, since data is converted into a data form matching the information device 11 before being sent, it is not necessary to re-send the data in a form matching each information device from the PC after stored in the storage unit or the like of a user-side PC. Namely, digital data will not be stored at the user side. Thus, it is possible to prevent any illegal copy of digital data.

Figure 10:
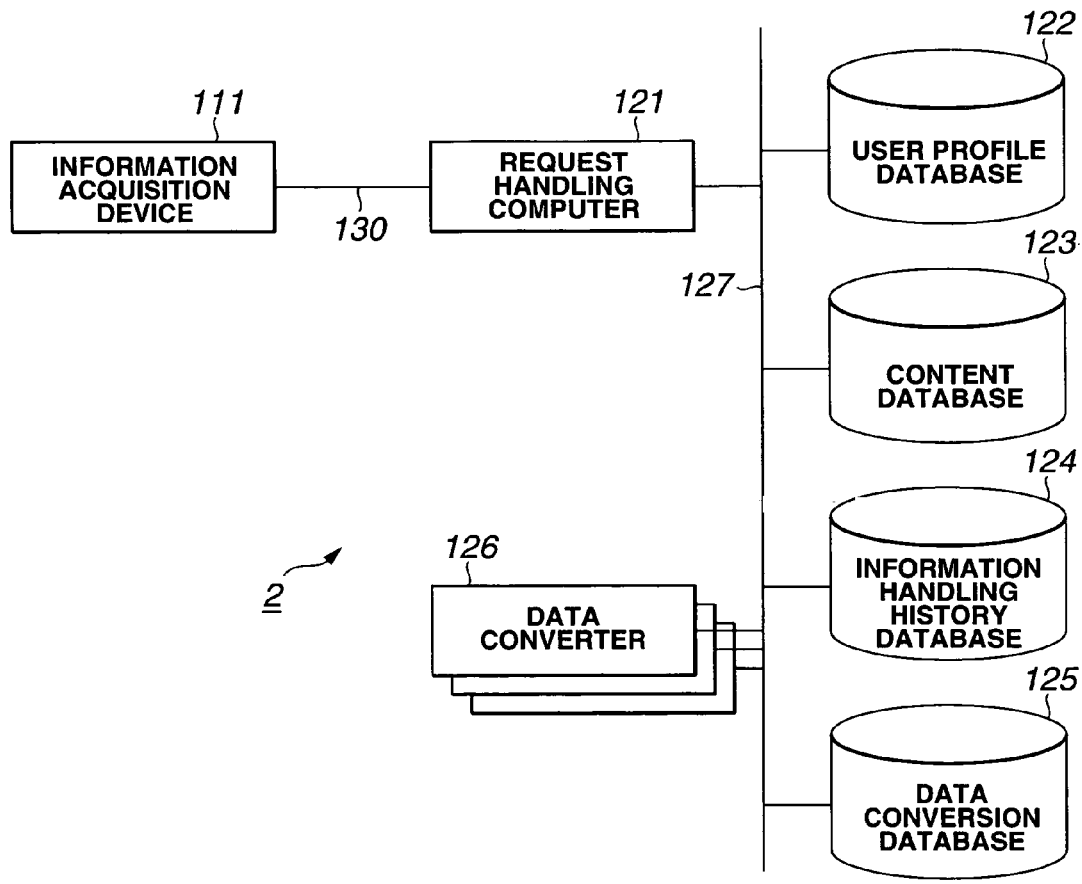
FIG. 10 is a block diagram of a second embodiment of the information providing system according to the present invention.

Referring now to FIG. 10, there is schematically illustrated in the form of a block diagram the second embodiment of the information providing system according to the present invention. The information providing system is generally indicated with a reference number 2.

As shown in FIG. 10, the information providing system 2 includes a user-side information acquisition device 111, server-side request handling computer 121, user profile database 122, content database 123, information handling history database 124, data conversion database 125 and a data converter 126.

The user-side information acquisition device 111 is capable of providing information in any of forms like sound, image, paper, etc. It is connected to the request handling computer 121 via the Internet. The information acquisition device 111 has information pre-stored therein in any information form in which it can provide information, such as JPEG, MPEG, WAV, MP3, ATRAC3, GIF, PNG, html, mail or the like (will be referred to as "data type" hereinafter).

The server-side request handling computer 121 is connected to the information acquisition device 111 via the Internet 130 and can send data to, and receive data from, the information acquisition device 111. Also the request handling computer 121 is connected to the user profile database 122, content database 123, information handling history database 124 and data conversion database 125 via a network 127, and can operate for insertion of information into each of the databases, search for information, updating of information, deletion of information, etc.

The server-side user profile database 122 has user information recorded therein, and can provide information hit by a search requested. Also, the user profile database 122 can operate for insertion, updating and deletion of user information upon request. It issues a user identifier when entering new user information.

The user information to be recorded to the user profile database 122 will be discussed herebelow:

The user information includes at least user identifier, preference information, phone number, address and device settings associated with each other as shown in FIG. 11.

The above "user identifier" is an identifier by a number, symbol or the like assigned to each user for unique identification of the latter.

The "preference identifier" is one or more information genre identifiers having been entered as a type or types of information of interest by a user having an associated user identifier.

The "information genre identifier" is an identifier by a number, symbol or the like assigned to each type of information.

The "device settings" is information about an information acquisition device 111 used by a user having an associated identifier when receiving provided information. It includes an identifier, on the network, of the request handling computer 121 to which the information acquisition device 111 is connected.

The server-side content database 123 has content information recorded therein, and can provide information hit by a search requested. Also, the content database 123 can insert, update or delete user information upon request, and issue an information identifier when entering new information.

Content information recorded to the content database 123 will be discussed herebelow:

As shown in FIG. 12, the content information includes, in association with each other, at least information identifier, information genre identifier, data type identifier, destination user identifier, title and information-providing user identifier.

The above "information identifier" is an identifier by a number, symbol or the like for unique identification of information.

The "information genre identifier" is an identifier by a number, symbol or the like indicating a type to which information having an associated information identifier belongs.

The "data type identifier" is an identifier by a number, symbol or the like indicating the type of information content.

The "destination user identifier" is a user identifier for an information acquirer which is to acquire information having an associated information identifier.

The "title" is a name, symbol, number or the like simply representing the content of information having an associated information identifier.

The "information-providing user identifier" is a user identifier for an information provider having provided information having an associated information identifier.

The information handling history database 124 has an information handling history, and can provide information hit by a search requested. Also, it can insert, update or delete an information handling history upon request.

An information handling history entered in the information handling history database 124 will be explained herebelow:

The information handling history information includes at least user identifier, date of information handling, information identifier, data type identifier and handling mode identifier associated with each other as shown in FIG. 13.

The above "user identifier" is any of user identifiers entered in the user profile database 122. It is an identifier by a number, symbol or the like for identification of a user having provided or acquired information.

The "date of information handling" is a date when information has been handled.

The "information identifier" is any of information identifiers entered in the content database 123. It is an identifier by a number, symbol or the like for identification of information having been provided to the user. The "data type identifier" is an identifier by a number, symbol or the like indicating the form of the information handled. The "handling mode identifier" is an identifier by a number, symbol or the like for identification of which the handling mode is, information provision or acquisition.

The server-side data conversion database 125 has data conversion information recorded therein, and can provide such information when a search is requested. Also, the data conversion database 125 can insert, update or delete data conversion information upon request.

Data conversion information recorded in the data conversion database 125 will be discussed herebelow:

The data conversion information includes at least converter identifier, input data type identifier and output data type identifier associated with each other, as shown in FIG. 14.

The "converter identifier" is an identifier by a name, number, symbol or the like representing a converter being a hardware or software or a combination of them to convert information from one data type to another. This identifier can be used to start up the converter.

The "input data type identifier" is an identifier by a number, symbol or the like representing a data type allowed as input to a converter having an associated converter identifier.

The "output data type identifier" is an identifier by a number, symbol or the like representing the type of a data output from a converter having an associated converter identifier.

The server-side data converter 126 is a hardware or software or a combination of them for conversion of information from one data type into another, connected to the request handling computer 121. It receives input data of a specific form from the request handling computer 121, and sends back a form-converted data to the request handling computer 121.

In the information providing system 2 shown in FIG. 10, all the sever-side request handling computer 121, user profile database 122, content database 123, information handling history database 124, data conversion database 125 and data converter 126 may be installed as separate devices or in an arbitrary combination or combinations.

Figure 15:
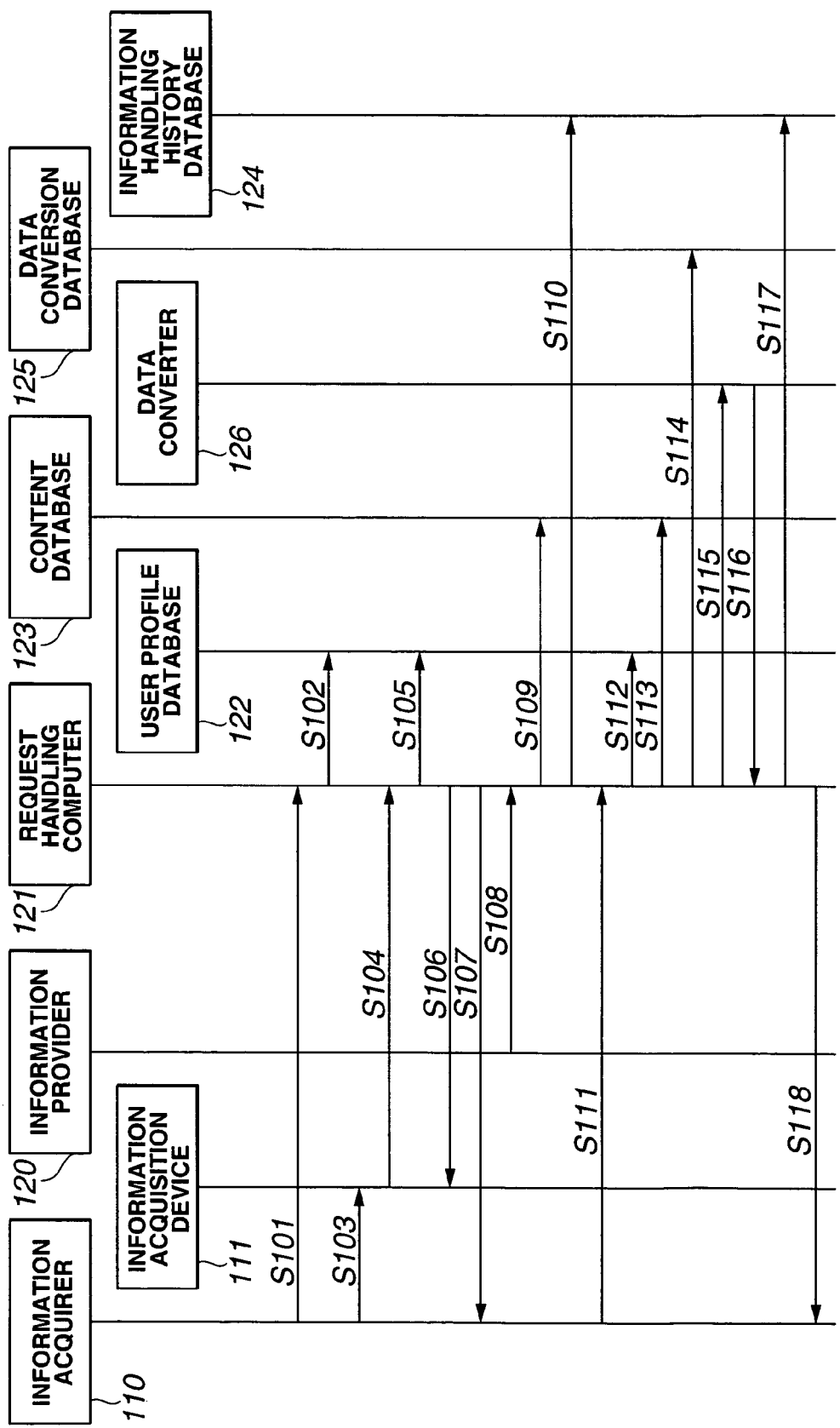
FIG. 15 diagrammatically illustrates a flow of operations including those up to entry of user information and setting and storage of the user information in an information device and those from entry of information by the information provider up to user's acquisition of the information, when data type of the information is converted by the exchange of information designating the user, in the information providing system in FIG. 10.

The information providing system 2 constructed as above functions as will be described herebelow:

For conversion of information from one data type into another through exchange of information designating an information provider, the information providing system 2 will go through steps S101 to S118 shown in FIG. 15 to make operations up to entry of user information and setting and storage of the user information in the information acquisition device 111 and operations including from entry of information by the information provider until acquisition of the information by an information acquirer.

That is, in step S101, the information acquirer 110 enters user information and device setting information to the request handling computer 121.

In next step S102, the request handling computer 121 records the entered user information and device setting information to the user profile database 122. At this time, a user identifier is issued to the information acquirer, and it is recorded along with the entered user information to the user profile database 122.

In step S103, the information acquirer 110 supplies his phone number to the information acquisition device 111 to designate acquisition of setting information.

In step S104, the information acquisition device 111 requests, according to the supplied phone number, the server-side request handling computer 121 for acquisition of setting information.

In step S105, the request handling computer 121 searches the user profile database 122 according to the phone number received from the information acquisition device 111 to acquire corresponding setting information from the user profile database 122.

In step S106, the setting information is sent from the request handling computer 121 to the information acquisition device 111 where it will be stored.

In step S107, the request handling computer 121 makes a call to the phone number received from the information acquisition device 111 to inform the called side that settings have been made, and requests the called side to check if any matter corresponding to the settings thus made has take place and to inform a predetermined destination that no corresponding matter has take place, if applicable.

The operations down to this phase cover the registration of user information.

Next in step S108, the information provider 120 will send information, data type identifier for the information, its own user identifier, destination user identifier, tile of the information and information genre identifier to which the information belongs to the request handling computer 121 where the information will be entered.

In step S109, the request handling computer 121 having accepted the information entry records the acquired information to the content database 123. At this time, an information identifier is issued and recorded along with the information to the content database 123.

In step S110, the request handling computer 121 informs that the user identifier for the information provider 120, information identifier, data type and handling mode are for entry of information, and records the information along with a date of data handling to the information handling history database 124.

Steps S108 and S109 cover the entry of information by the information provider 120. The entry is done once or repeated several times.

Next in step S111, the information acquirer 110 requests, by the information acquisition device 111, the request handling computer 121 for acquisition of information. At this time, the information acquisition device 111 extracts a user identifier from the setting information stored in addition to already recorded reproducible data type identifier, and sends it to the request handling computer 121.

In step S112, the request handling computer 121 acquires user information from the user profile database 122 according to the received user identifier.

In step S113, the request handling computer 121 searches the content database 123 according to the acquired user information under any of the following conditions a and b:

Condition a: Destination user identifier coincides with the user identifier for the information acquirer 110.
Condition b: Information genre identifier coincides with preference information pre-entered by the information acquirer 110.

Further in step S114, the request handling computer 121 identifies the data converter 126 by searching the data conversion database 125 with the data type identifier for the information hit by the search being taken as an input data type identifier and the data type identifier received from the information acquisition device 111 being taken as an output data type identifier.

Then in step S115, the request handling computer 121 passes the information hit in step S114 to the data converter 126 to make a request for data type conversion.

In step S116, the data converter 126 converts the information received from the request handling computer 121 in data type and passes it to the request handling computer 121.

In step S117, the request handling computer 121 informs that the user identifier for the information acquirer, information identifier, data type and handling mode are for acquisition of information, and records the information along with a date of data handling to the information handling history database 124.

The request handling computer 121 sends the converted data received from the data converter 126 to the information acquirer 110 via the information acquisition device 111.

Figure 16:
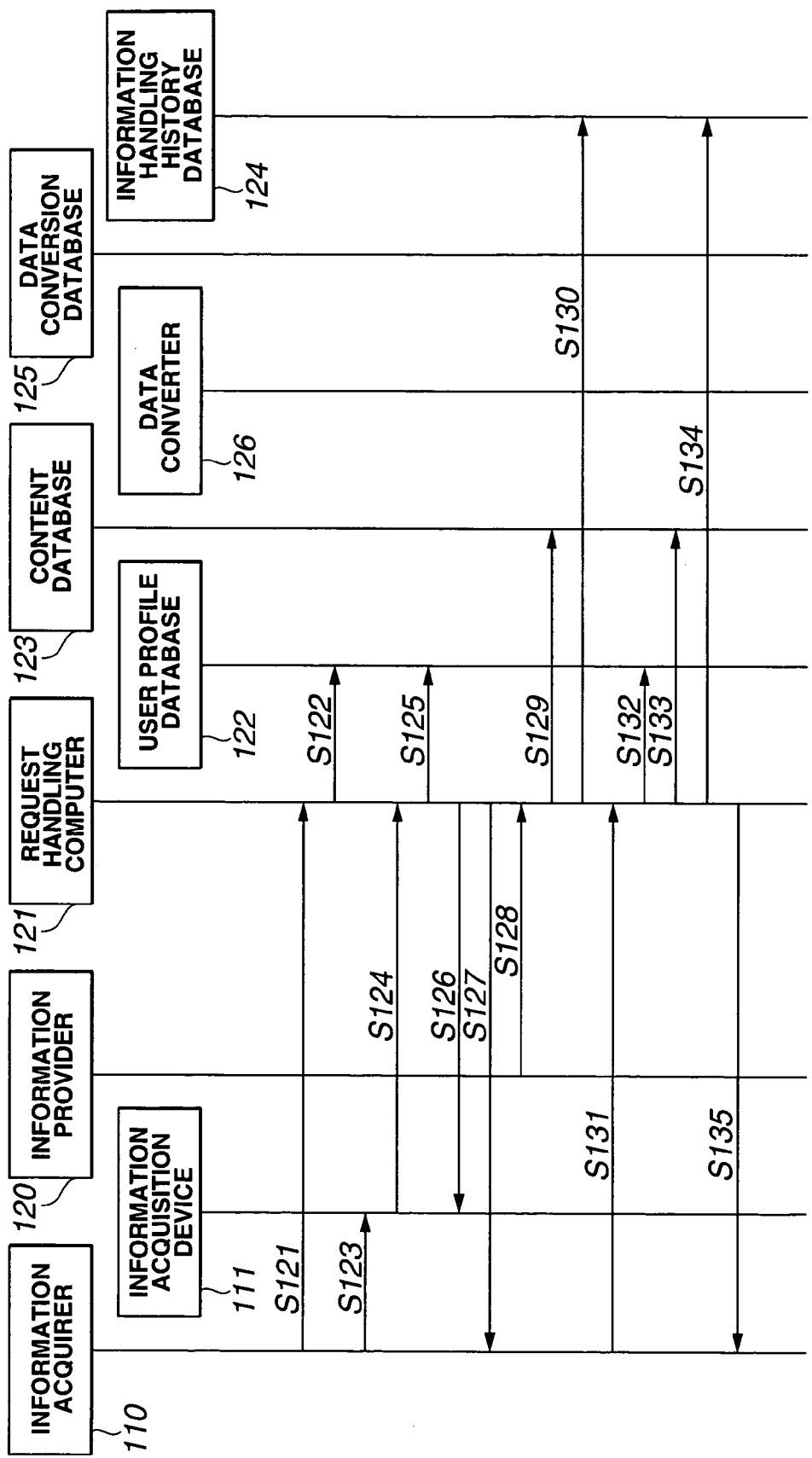
FIG. 16 diagrammatically illustrates a flow of operations made for user's acquisition of information, when the information is selected according to a requested data type by the exchange of information designating the user, in the information providing system in FIG. 10.

Also, for the information acquirer 110 to acquire information in selection of information according to a requested data type through exchange of information designating an information acquirer, the information providing system 2 will go through steps S121 to S135 shown in FIG. 16.

The operations in steps S121 to S130 shown in FIG. 16 are the same as those in steps S101 to S110 shown in FIG. 15. So, their explanation will be omitted.

In step S131, the information acquirer 110 requests, by the information acquisition device 111, the request handling computer 121 for acquisition of information. At this time, the information acquisition device 111 extracts a user identifier from setting information stored in addition to already recorded reproducible data type identifier, and sends it to the request handling computer 121.

In step S132, the request handling computer 121 acquires user information from the user profile database 122 according to the received user identified.

Also in step S133, the request handling computer 121 searches, according to the acquired user information, the content database 123 for information meeting both the following conditions A and B:

Condition A: Destination user identifier coincides with the user identifier for the information acquirer 110. Alternatively, Information genre identifier coincides with preference information pre-entered by the information acquirer 110.
Condition B: Data type information for information coincides with the data type identifier received from the information acquisition device 111.

In step S134, the request handling computer 121 informs that the user identifier for the information acquirer 110, information identifier, data type and handling mode are for acquisition of information, and records the information along with the data of information handling to the information handling history database 124.

Then in step S125, the request handling computer 121 sends data received from the content database 123 to the information acquirer 110 via the information acquisition device 111.

Figure 17:
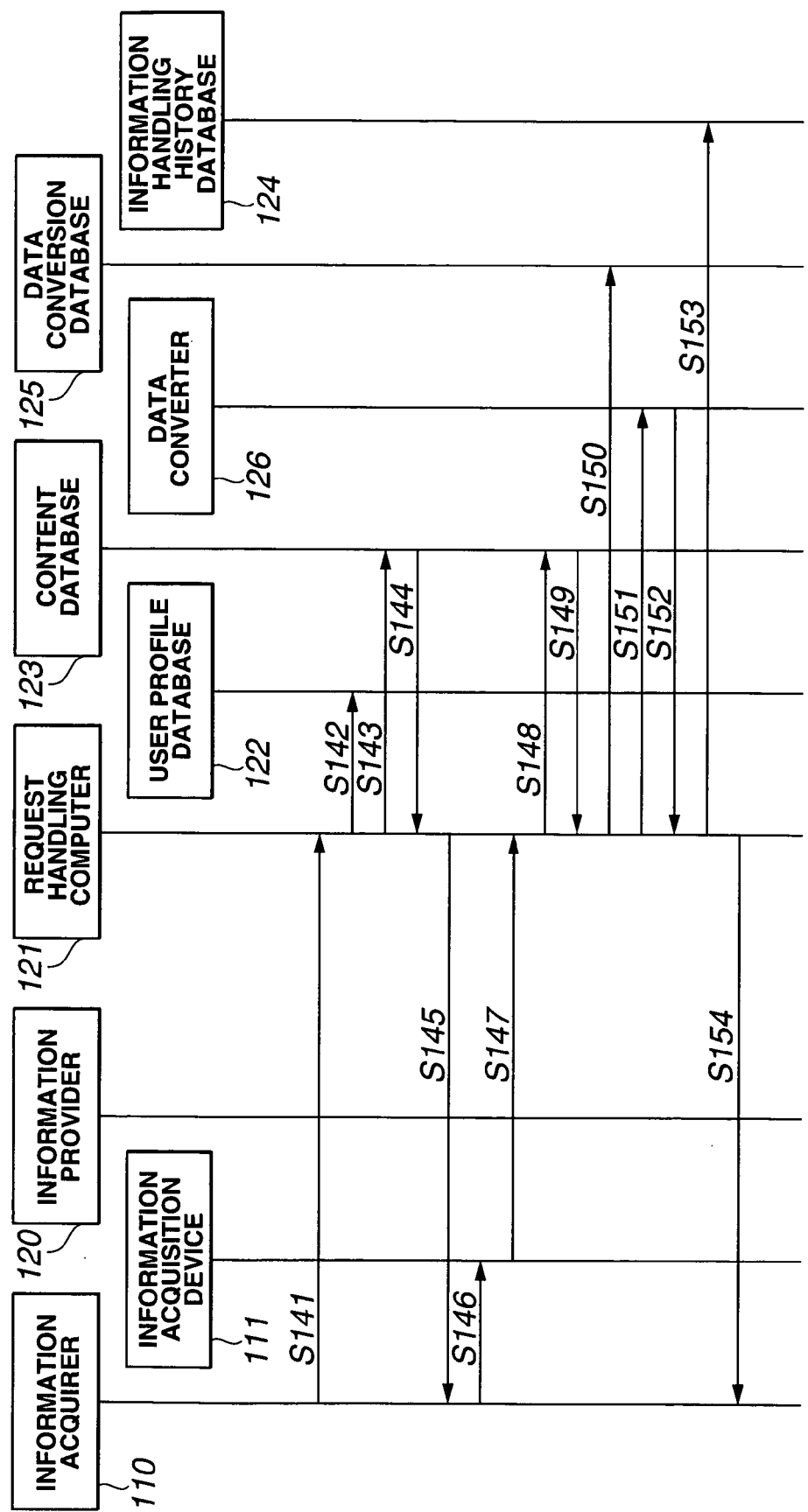
FIG. 17 diagrammatically illustrates a flow of operations including from user's acquisition of an information list up to acquisition of information when the user acquires information by selecting it from information entered in the information providing system in FIG. 10 through conversion of a data type of the information.

For the information acquirer to selectively acquire information from information entered in the system, the information providing system 2 will go through steps S141 to S154 shown in FIG. 17 to make operations including from acquisition of information list by the information acquirer until acquisition of information in case the information has to be converted in data type.

That is, in step S141, the information acquirer 110 requests, by the information acquisition device 111, the request handling computer 121 for acquisition of an information list. At this time, the information acquisition device 111 extracts a user identifier from the setting information stored in addition to already recorded reproducible data type identifier, and sends it to the request handling computer 121.

In step S142, the request handling computer 121 acquires user information from the user profile database 122 according to the user identifier received from the information acquisition device 111.

In step S143, the request handling computer 121 searches the content database 123 for entered information according to the acquired user information. At this time, if information to be acquired is limited under the following condition, the information acquirer may not receive any excessive information.

Condition: Information genre identifier coincides with preference information pre-entered by the information acquirer 110.

In step S144, the request handling computer 121 acquires the information list from the content database 123.

Then in step S145, the request handling computer 121 sends the acquired information list to the information acquirer 110 via the information acquisition device 111.

In step S146, the information acquirer 110 selects one or more pieces of information from the received information list, and the information acquisition device 111 requests the request handling computer 121 for acquisition of the selected information in step S147.

In step S148, the request handling computer 121 searches the content database 123 for the information requested to acquire by the information acquisition device 111, and acquires the information requested to acquire by the information acquisition device 111 from the content database 123 in step S149.

In next step S150, the request handling computer 121 searches the data conversion database 125 with the data type identifier for the acquired information being taken as an input data type identifier and the data type identifier received from the information acquisition device 111 being taken as an output data type identifier, and identify the data converter 126.

In step S151, the request handling computer 121 passes the information acquired in step S149 to the data converter 126 and requests conversion of the information in data type.

In step S152, the data converter 126 converts the received information in data type, and passes the information to the request handling computer 121.

In step S153, the request handling computer 121 informs that the user identifier for the information acquisition device 110, information identifier, data type and handling mode are for acquisition of information, and records the information along with the data of data handling to the information handling history database 124.

In step S154, the request handling computer 121 sends the converted data received from the data converter 126 to the information acquirer 110 via the information acquisition device 111.

Figure 18:
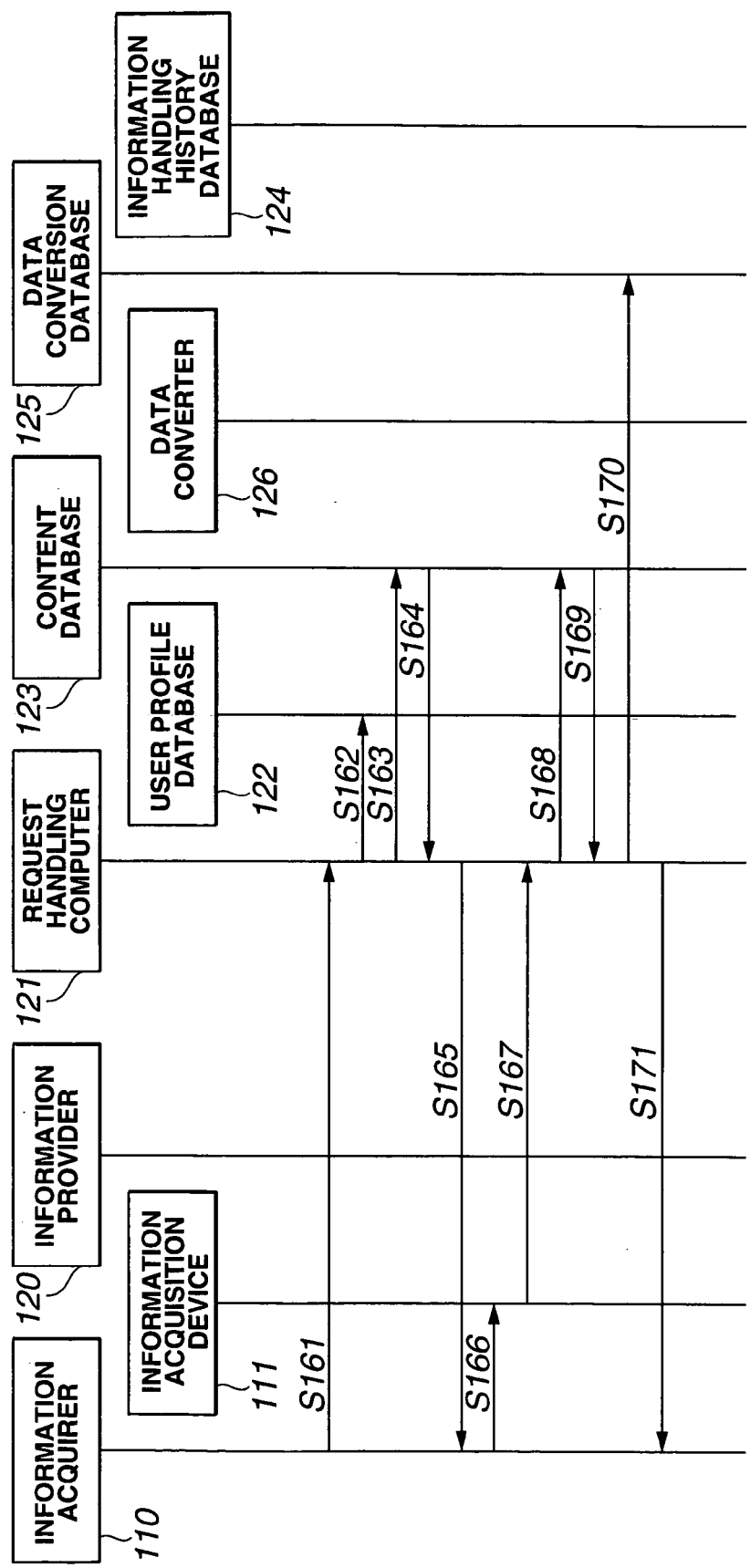
FIG. 18 diagrammatically illustrates a flow of operations including from user's acquisition of an information list up to acquisition of information when the user acquires information by selecting it from information entered in the information providing system in FIG. 10 through information selection made according to a requested data type.

Also, for the information acquirer to selectively acquire information from information entered in the system, the information providing system 2 will go through steps S161 to S171 shown in FIG. 18 to make operations including from acquisition of information list by the information acquirer until acquisition of information in case information is selected according to a required data type.

That is, in step S161, the information acquirer 110 requests, by the information acquisition device 111, the request handling computer 121 for acquisition of an information list. At this time, the information acquisition device 111 extracts a user identifier from the setting information stored in addition to already recorded reproducible data type identifier, and sends it to the request handling computer 121.

In step S162, the request handling computer 121 acquires user information from the user profile database 122 according to the user identifier received from the information acquisition device 111.

In step S163, the request handling computer 121 searches the content database 123 for entered information according to the acquired user information. At this time, if information to be acquired is limited under the following condition, the information acquirer may not receive any excessive information.

Condition: Information genre identifier coincides with preference information pre-entered by the information acquirer 110.

In step S164, the request handling computer 121 acquires the information list from the content database 123.

Then in step S165, the request handling computer 121 sends the acquired information list to the information acquirer 110 via the information acquisition device 111.

In step S166, the information acquirer 110 selects one or more pieces of information from the received information list, and the information acquisition device 111 requests the request handling computer 121 for acquisition of the selected information in step S167.

In step S168, the request handling computer 121 searches the content database 123 for the information requested to acquire by the information acquisition device 111, and acquires the information requested to acquire from the content database 123 in step S169.

Also in step S170, the request handling computer 121 informs that the user identifier for the information acquirer, information identifier, data type and handling mode are for acquisition of information, and records the information along with the date of information handling to the information handling history database 124.

Then in step S171, the request handling computer 121 sends the data acquired from the content database 123 to the information acquirer 110 via the information acquisition device 111.

That is, in the information providing system 2, the intermediation for the information acquirer to acquire information provided by the information provider is done as will be described herebelow:

The information provider enters a data type identifier for information provided in addition to information provided from the information provider into the content database 123 in the information providing system 2.

The information acquirer sends a data type identifier corresponding to a data type he wants to acquire when requesting to acquire information to the user profile database 122 in the information providing system 2.

Then, in the information providing system 2, information of a data type the information acquirer requests is sent to the information acquirer by making the following operations:

Operation 1: Information having been entered by the information provider in the user profile database 122 is converted into a data type the information acquirer has requested. The "conversion" referred to herein includes an equivalent exchange as well.

Operation 2: Information matching a data type the information acquirer has requested is selected from information having been entered by the information provider in the content database 123.

Also in the information providing system 2, an intermediation for exchange of information designating an information acquirer is done as will be described below:

Namely, a user identifier being unique in the information providing system 2 is issued to the information acquirer in advance.

Also, a user identifier (will be referred to as "destination" hereinafter) for an information acquirer who is to acquire information provided by the information provider is also entered.

At the time of requesting for acquisition of information, the information acquirer sends also his own user identifier to the request handling computer 121.

In response to the request for acquisition of information from the information acquirer, the server-side request handling computer 121 performs the above "operation 1" or "operation 2" by effecting data conversion or selection for only an information acquirer whose user identifier coincides with information destination, and sends information to the information acquirer.

Also in the information providing system 2, an intermediation for distribution of an advertisement is done as will be described below:

That is, the information acquirer pre-enters an information genre identifier corresponding to an information genre of interest to the user profile database 122.

When the information provider provides information, an information genre identifier corresponding to an information genre to which the provided information belongs is also entered into the content database 123.

At the time of requesting acquisition of information, the information acquirer sends also his own user identifier to the server-side request handling computer 121.

In response to a request for acquisition of information from the information acquirer, the request handling computer 121 acquires preference information having been entered by the information acquirer from the user profile database 122 according to the user identifier for the information acquirer, selects one or more pieces of information matching the preference information from information having been entered by the information provider in the content database 123, performs the above "operation 1" or "operation 2" for the selected information, and sends the information to the information acquirer.

When sending the information to a user as above, an advertisement is added as will be described below:

That is, the information acquirer enters an information genre identifier corresponding to the preference information into the user profile database 122.

At the time of requesting acquisition of information, the information acquirer sends also his own user identifier to the content database 123.

When requesting acquisition of information, the information acquirer sends also his own user identifier to the request handling computer 121.

In response to a request for acquisition of information from the information acquirer, the request handling computer 121 acquires preference information having been entered by the information acquirer from the user profile database 122 according to the user identifier for the information acquirer, selects one or more pieces of information matching the preference information from information having been entered by the information provider in the content database 123, performs the above "operation 1" or "operation 2" for the selected information. The request handling computer 121 adds the information thus acquired to user destination information for sending.

Also in the information providing system 2, information is selected as will be described below:

That is, when providing information, the information provider enters also a tile representing the content of the information to be provided into the content database 123.

Before requesting acquisition of information, the information acquirer will request the request handling computer 121 for an information list entered in the content database 123 and acquires the information list.

The information acquirer selects one or more pieces of information from the information list, and sends the information to the request handling computer 121.

The request handling computer 121 performs the above "operation 1" or "operation 2" for the information selected by the information acquirer, and sends the information to the information acquirer.

Also in the information providing system 2, the information acquirer pre-enters user information such as his age, sexuality, profession, address and the like into the user profile database 122, and accepts a user identifier from the request handling computer 121.

When having acquired the information, the information acquirer records of what genre the acquired information is and in what data type the information has been acquired into the information handling history database 124, and utilizes the information along with the entered user identifier as marketing data.

Also in the information providing system 2, when accepting the user identifier issued, the information acquirer enters his phone number into the user profile database 122.

The information acquirer informs the request handling computer 121 of his phone number via the information acquisition device 111 used for acquisition and utilization of the information.

The request handling computer 121 having received the phone number from the information acquirer searches the user identifiers entered in the user profile database 122 for a one whose entered phone number coincides with the received phone number, and sends the user identifier to the information acquisition device 111.

The information acquisition device 111 will store the received user identifier for utilization thereof when making a subsequent request for acquisition of information.

Also, to assure that the received phone number has been sent from the information acquirer having entered it into the user profile database 122, the request handling computer 121 calls the received phone number, and informs the called side that the user identifier has been acquired based on the phone number, and requests the called side to check if there has taken place any matter corresponding to the information acquisition done using the phone number and to answer back to the calling side to inform that no such corresponding matter has taken place, if applicable.

Note that in case there is information to be set in the information acquisition device 111 in addition to the user identifier such as a password, the information is also sent from the request handling computer 121 to the information acquisition device 111 in which it will be set.

In the information providing system 2, all information devices are used as information distribution terminals on the Internet such that we can acquire information available on the Internet as if we used a conventional medium. The advertiser can limit the information providing routes. Since information is pre-converted into a data form matching the information acquisition device 111 before being sent, it is not necessary to store data into a storage unit of a user-side PC or the like and then re-send it in a form matching each device from the PC and thus digital data will not be stored at the user side. Thus, it is possible to prevent digital data from being illegally copied. With extremely simple operations of the device, information available on the Internet can be acquired. Further, information can be exchanged even between devices supporting different data types.

Also in the information providing system 2, even an information device with no complicated input unit can acquire information from the Internet and utilize the information. In addition, in the information providing system 2, the information provider can provide information without so much awareness of the type of a device used by an information acquirer, which will enable higher-efficiency exchange of information.

The present invention will be described concerning embodiments to attain the previously mentioned second object.

Figure 19:
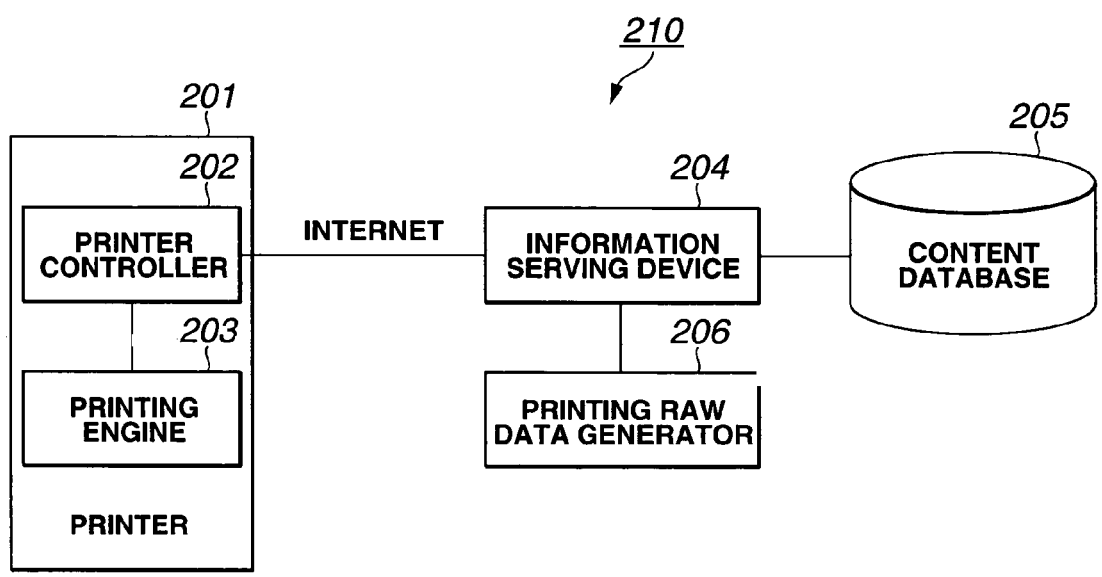
FIG. 19 is a block diagram of a third embodiment of the information providing system according to the present invention.

Referring now to FIG. 19, there is schematically illustrated in the form of a block diagram the embodiment of the information providing system according to the present invention. The information providing system is generally indicated with a reference number 210.

As shown in FIG. 19, the information providing system 210 includes a printer 201 as a user-side terminal, an information serving device 204 to which the printer 201 is connected via the Internet, a content database 205 connected to the information serving device 204, and a printing raw data generator 206.

The printer 201 includes a printer controller 202, and a printing engine 203 connected to the printer controller 202.

The printer controller 202 can be connected to the Internet and can send and received data to and from the Internet. Also, it can send and receive data to and from the printing engine 203. Further, the printer controller 202 can accept a request for printing from a user.

The printing engine 203 can print out data received from the printer controller 202.

The information serving device 204 is a computer connectable to the Internet and which can send and receive data to and from the Internet. The information serving device 204 is connected to the content database 205, and can search the content database 205 to read data from the latter. Also, the information providing device 204 is connected to the printing raw data generator 206, and can send and receive data to and from the printing raw data generator 206.

The content database 205 can send and receive data to and from the information serving device 204. The content database 205 can store, search and read data in response to a request from the information serving device 204.

Further, the printing raw data generator 206 is a computer different from the computer as the information serving device 204. It can send and receive data to and from the information serving device 204 connected thereto. Also, the printing raw data generator 206 can convert data acquired by the information serving device 204 from the content database 205 into a form the printing engine 203 in the printer 201 as the user-side terminal can interpret, that is, into a form of the printing raw data.

Note that the printing raw data generator 206 may be a software module operable on the information serving device 204.

Figure 20:
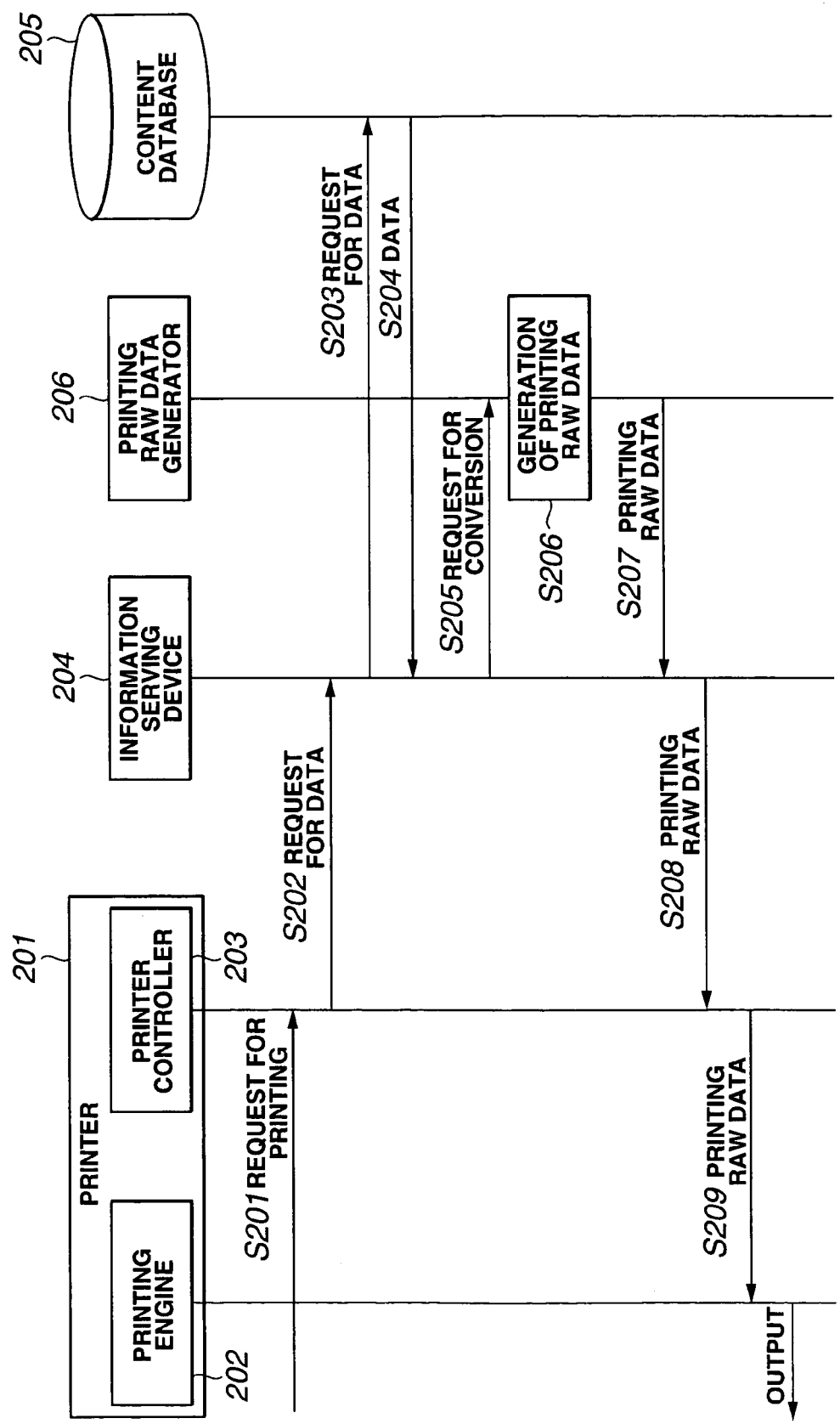
FIG. 20 illustrates a flow of operations, made in the information providing system in FIG. 19, for printing out data available on the Internet.

In the information providing system 210 constructed as above, information provided from the Internet-side information serving device 204 is printed out by the printer 201 as the user-side terminal as shown in FIG. 20.

More specifically, first in step S201, the printer controller 202 receives a request for printing from a user. At this time, the print request includes a data identifier which identifies data to be printed.

In next step S202, the printer controller 202 sends a data identifier designated in a print request from the user to the information serving device 204 to make a request for data.

In step S203, the information serving device 204 sends, to the content database 205, a data identifier included in the data request from the printer controller 202 to make a request for data.

In step S204, the content database 205 searches data corresponding to the designated data identifier and transfers the data to the information serving device 204.

In step S205, the information serving device 204 sends the data received from the content database 205 to the printing raw data generator 206 to make a request for conversion of the data into the printing raw data.

In step S206, the printing raw data generator 206 generates, for the data received from the content database 205, printing raw data including raster data in a to-be-printed image and printer control command.

In step S207, the printing raw data generator 206 sends the printing raw data thus generated to the information serving device 204.

In step S208, the information serving device 204 sends the printing raw data received from the printing raw data generator 206 to the printer controller 202. At this time, the data is compressed for the sending. The data compression may be done after the printing raw data is generated in step S206. Also, the data to be sent should more preferably be encoded.

Then in step S209, the printer controller 202 sends the printing raw data received from the information serving device 204 to the printing engine 203 for printing the data. At this time, all data may be sent to the printing engine 203 at once or at a plurality of times. In the latter case, printing can advantageously be done while the operating condition of the printing engine 203 is being checked. Also, in case the printing raw data received from the information serving device 204 has been encoded, printing raw data decoded by the printer controller 202 is sent to the printing engine 203.

In the information providing system 210, since digital data will not be stored at the user-side terminal, it is extremely difficult to copy the digital data illegally.

Also, since the printing raw data is generated at the information serving device 204, the printer 201 may not have any function of preparing printing raw data, so that the printer 201 can be provided at a lower price.

Figure 21:
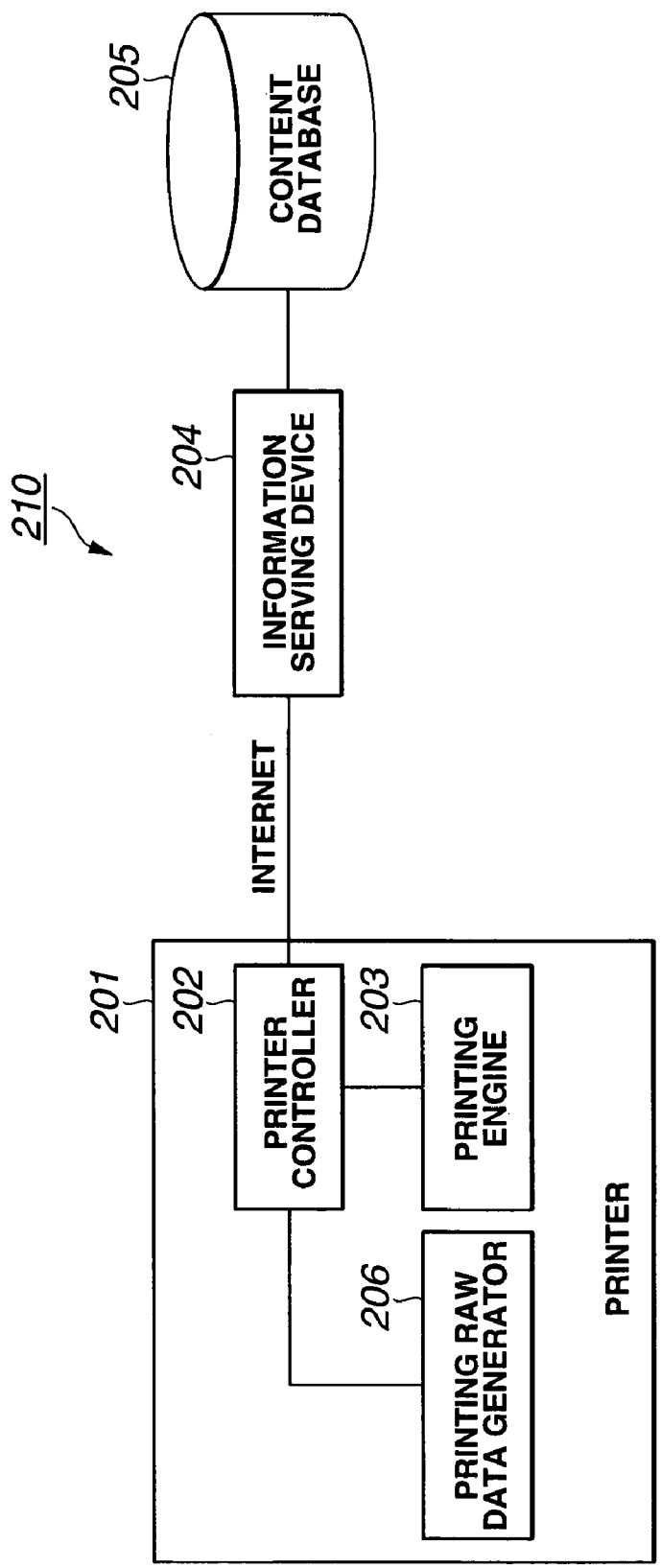
FIG. 21 is a block diagram of a fourth embodiment of the information providing system according to the present invention, in which the printer is provided with a printing raw data generator.

Note that in case the printer 201 includes the printing raw data generator 206 as shown in FIG. 21, the form of data sent from the information serving device 204 to the printer controller 202 may be any of HTML, JPEG, GIF, PNG, DOPF, EXIF, TIFF, PDF, PostScript and the like which would allow the printing raw data generator 206 to convert the data into the printing raw data.

More specifically, in the information providing method according to the present invention and carried out in the information providing system 210, when printing data available on the Internet, printing raw data including raster data in a to-be-printed image and printer control command is generated at the data sending side on the Internet and the printing raw data thus generated is sent. The operation for generating and sending the printing raw data can dynamically be done at each request for printing. Also, the generated printing raw data can be sent directly to the printer via the Internet for printing thereof. Further, the generated printing raw data can be compressed for the sending.

Also in the information providing system 210, the information serving device 204 searches, in response to a print request from the user-side printer 201, the content database 205 for data corresponding to the print request, generates printing raw data including raster data in a to-be-printed image in the data read from the content database 205 and printer control command, and sends the printing raw data thus generated via the Internet. Also, the information serving device 204 dynamically generates and sends the printing raw data at each request for printing. Moreover, the information serving device 204 can send the generated printing raw data directly to the user-side printer 201 via the Internet. Furthermore, the information serving device 204 can compress the generated printing raw data for the sending.

As having been described in the foregoing, the aforementioned first object of the present invention is attained as follows:

By issuing a user identifier to a user who makes a contract for information service and has an information device capable of setting a user identifier carrying a medium type indicating the type of information matching the information device and of connection to the network, and entering and storing user profile data indicating information to be provided correspondingly to the user identifier, a database having recorded therein content data associated with the medium type and information genre can be searched by the request handling means in response to a request from the information device to acquire information to be provided according to the user profile data, and the acquired information can be provided as content data of a medium type matching the information device to the information device via the network.

Also, according to the present invention, a user identifier is issued to a user who makes a contract for information service and has an information device capable of setting a user identifier carrying a data type indicating the type of information matching the information device and of connection to the network, and entering and storing user profile data indicating information to be provided correspondingly to the user identifier is entered and stored, whereby a database having recorded therein content data associated with the data type and information genre can be searched by the request handling means in response to a request from the information device to acquire information to be provided according to the user profile data, the information be converted by the data converting means into a data type matching the information device according to data conversion information for conversion of information from a data type into another, and the information thus converted can be provided to the information device.

Therefore, the present invention enables even an information device without any complicated input unit to acquire information from the Internet for utilization thereof and the information provider to provide information without so much awareness of the type of a device used the an information acquirer, which will enable higher-efficiency exchange of information.

Further, the second object of the present invention is attained as will be described below:

In an information providing system including an information serving device and user-side printer, connected to each other via the Internet, the information serving device searches, in response to a print request from the user-side printer, a database for data corresponding to the print request, a printing raw data including raster data in a to be-printed image of the data read from the data base is generated, and the printing raw data thus generated is sent via the Internet. Therefore, when printing data available on the Internet, digital data in the to be-printed image will not be stored at the user-side terminal but an image can be printed out from the user-side printer as the user-side terminal.

Since the digital data will not be stored at the user-side terminal when printing out data available on the Internet, it is extremely difficult to copy the digital data illegally. Also, since the information serving device generates a printing raw data, the printer may not have any function of generating a printing raw data and can be provided at a low price.

The invention claimed is:

1. A method of providing information, via a network, to an information device capable of setting a user identifier carrying a medium type indicating an information type matching the information device and identifying an information-provided user, and also capable of connection to the network, the method comprising the steps of:

issuing a user identifier to a user who makes a contract for an information service, and entering and storing user profile data indicating information to be provided correspondingly to the user identifier;

connecting to an information serving device to which the information device is connected via the network, the information serving device including:

a database having recorded therein user profile data indicating information to be served correspondingly to the user identifier and content data associated with a medium type and information genre; and a request handling means for searching, upon request from the information device, the database to acquire the content data from the database and supplying the information device with the content data as content data of a medium type matching the information device, searching, upon request from the information device, the database, to acquire the information to be provided based on the user profile data; and providing the information as content data of the medium type matching the information device to the information device via the network, wherein information, which is to be provided based on the user profile data acquired from the database having recorded therein, in association with each other, the user profile data including an user identifier, preference information, phone number and device setting information, is acquired from the database, converted into content data of the data type matching the information device, and provided to the information device.

2. The method as set forth in claim 1, wherein there is stored an information provision history of the content data having been provided to the user.

3. A method of providing information, via a network, to an information device capable of setting a user identifier carrying a data type indicating an information type matching the information device and identifying an information-provided user, and also capable of connection to the network, the method comprising the steps of:

issuing a user identifier to a user who makes a contract for an information service, and entering and storing user profile data indicating information to be provided correspondingly to the user identifier;

connecting to an information serving device to which the information device is connected via the network, the information serving device including:

a database having recorded therein user profile data indicating information to be served correspondingly to the user identifier and content data associated with a medium type and information genre; and a request handling means for searching, upon request from the information device, the database to acquire the content data from the database and supplying the information device with the content data as content data of a medium type matching the information device, searching, upon request from the information device, the database, to acquire, information to be provided based on the user profile data; and converting the information into content data of the data type matching the information device according to data conversion information for conversion of information in data type from one into another, and providing the information to the information device, wherein information, which is to be provided based on the user profile data acquired from the database having recorded therein, in association with each other, the user profile data including an user identifier, preference information, phone number and device setting information, is acquired from the database, converted into content data of the data type matching the information device, and provided to the information device.

4. The method as set forth in claim 3, wherein from the database having recorded therein, in association with each other, the content data including an information identifier for uniquely identifying information, information genre identifier indicating a genre to which information having an associated information identifier belongs, data type identifier indicating a type of the information content, destination user identifier for an information-acquiring user who is to acquire the information having the associated information identifier, title representing the content of the information having the associated information identifier, and an information-providing user identifier indicating an information provider having provided the information having the associated information identifier, content data corresponding to a request from the information device is acquired, converted into content data of the data type matching the information device, and provided to the information device.

5. The method as set forth in claim 3, wherein based on the data conversion information acquired from the database having recorded therein, in association with each other, the data conversion information including a converter identifier indicating a converter which converts information from a data type into another, an input data type identifier indicating a data type allowed for input to a converter having a converter identifier associated therewith, and an output data type identifier indicating a data type of data output from the converter having the associated converter identifier, the information is converted into content data of the data type matching the information device, and provided to the information device.

6. The method as set forth in claim 3, wherein there is stored an information handling history of the content data having been provided to the user.

7. The method as set forth in claim 6, wherein there are stored in association with each other as information included in the information handling history a user identifier for identifying a user having provided or acquired information, date of the information handling, information identifier for identifying information having been provided to the user, data type identifier indicating a type of information having been acquired, and an operation identifier for identifying for which the mode of information handling operation is, information provision or acquisition.

8. An information providing system comprising:

an information device capable of setting a user identifier to a user who makes a contract for an information service, and entering and storing user profile data indicating information to be provided correspondingly to the user identifier, the user identifier carrying a medium type indicating an information type matching the information device and identifying an information-provided user, and also capable of connection to a network; and an information serving device to which the information device is connected via the network, the information serving device including:

a database having recorded therein user profile data indicating information to be served correspondingly to the user identifier and content data associated with a medium type and information genre; and a request handling means for searching, upon request from the information device, the database to acquire information to be provided based on the user profile data, and supplying the information device with the information, as content data of, the medium type matching the information device via the network, wherein information, which is to be provided based on the user profile data acquired from the database having recorded therein, in association with each other, the user profile data including an user identifier, preference information, phone number and device setting information, is acquired from the database, converted into content data of the data type matching the information device, and provided to the information device.

9. The system as set forth in claim 8, wherein the request handling means records the information provision history of the content data having been provided to the user.

10. An information providing system comprising:

an information device capable of setting a user identifier carrying a data type indicating an information type matching the information device and identifying an information-provided user, and also capable of connection to a network; and an information serving device to which the information device is connected via the network, the information serving device including:

a database having recorded therein user profile data indicating information to be served correspondingly to the user identifier for a user having made a contract for an information service, content data associated with a medium type and information genre and data conversion information for conversion of information in data type from one into another;

a data converting means for converting content data in data type from one into another; and a request handling means for searching, upon request from the information device, the database having recorded therein the content data associated with the data type and information genre to acquire, from the database, information to be provided based on the user profile data, converting the information by the data converting means according to the data conversion information into content data of the data type matching the information device, and providing the information to the information device via the network, wherein the database has recorded therein, in association with each other, the user profile data including an user identifier, preference information, phone number and device setting information, wherein information, which is to be provided based on the user profile data acquired from the database is converted into content data of the data type matching the information device, and provided to the information device.

11. The system as set forth in claim 10, wherein the database has recorded therein, in association with each other, the content data including an information identifier for uniquely identifying information, information genre identifier indicating a genre to which information having an associated information identifier belongs, data type identifier indicating a type of the information content, destination user identifier for an information-acquiring user who is to acquire the information having the associated information identifier, title representing the content of the information having the associated information identifier, and an information-providing user identifier indicating an information provider having provided the information having the associated information identifier.

12. The system as set forth in claim 10, wherein the database has recorded therein, in association with each other, the data conversion information including a converter identifier indicating a converter which converts information from a data type into another, an input data type identifier indicating a data type allowed for input to a converter having a converter identifier associated therewith, and an output data type identifier indicating a data type of data output from the converter having the associated converter identifier.

13. The system as set forth in claim 10, wherein the request handling means records, to the database, an information handling history of the content data having been provided to the user.

14. The system as set forth in claim 13, wherein the request handling means records, to the database in association with each other, a user identifier for identifying a user having provided or acquired information, date of the information handling, information identifier for identifying information having been provided to the user, data type identifier indicating a type of information having been acquired, and an operation identifier for identifying for which the mode of information handling operation is, information provision or acquisition, as information included in the information handling history.

15. An information serving device to which there is connected via a network an information device capable of setting a user identifier to a user who makes a contract for an information service, and entering and storing user profile data indicating information to be provided correspondingly to the user identifier, the user identifier carrying a medium type indicating an information type matching the information device and identifying an information-provided user, and also capable of connection to a network is connected via the network, the information serving device comprising:

a database having recorded therein user profile data indicating information to be served correspondingly to the user identifier and content data associated with a medium type and information genre; and a request handling means for searching, upon request from the information device, the database to acquire information to be provided based on the user profile data, and supplying the information device with the information, as content data of, the medium type matching the information device, wherein information, which is to be provided based on the user profile data acquired from the database having recorded therein, in association with each other, the user profile data including an user identifier, preference information, phone number and device setting information, is acquired from the database, converted into content data of the data type matching the information device, and provided to the information device.

16. The device as set forth in claim 15, wherein the request handling means records, to the database, an information provision history of the content data having been provided to the user.

17. An information serving device to which there is connected via a network an information device capable of setting a user identifier carrying a data type indicating an information type matching the information device and identifying an information-provided user, and also capable of connection to a network is connected via the network, the information serving device comprising:

a database having recorded therein user profile data indicating information to be served correspondingly to the user identifier for a user having made a contract for information service, content data associated with a medium type and information genre and data conversion information for conversion of information in data type from one into another;

a data converting means for converting content data in data type from one into another; and a request handling means for searching, upon request from the information device, the database having recorded therein the content data associated with the data type and information genre to acquire, from the database, information to be provided based on the user profile data, converting the information by the data converting means according to the data conversion information into content data of the data type matching the information device, and providing the information to the information device via the network, wherein the database has recorded therein, in association with each other, the user profile data including an user identifier, preference information, phone number and device setting information, wherein information, which is to be provided based on the user profile data acquired from the database is converted into content data of the data type matching the information device, and provided to the information device.

18. The device as set forth in claim 17, wherein the database has recorded therein, in association with each other, the content data including an information identifier for uniquely identifying information, information genre identifier indicating a genre to which information having an associated information identifier belongs, data type identifier indicating a type of the information content, destination user identifier for an information acquiring user who is to acquire the information having the associated information identifier, title representing the content of the information having the associated information identifier, and an information-providing user identifier indicating an information provider having provided the information having the associated information identifier.

19. The device as set forth in claim 17, wherein the database has recorded therein, in association with each other, the data conversion information including a converter identifier indicating a converter which converts information from a data type into another, an input data type identifier indicating a data type allowed for input to a converter having a converter identifier associated therewith, and an output data type identifier indicating a data type of data output from the converter having the associated converter identifier.

20. The device as set forth in claim 17, wherein the request handling means records, to the database, an information handling history of the content data having been provided to the user.

21. The device as set forth in claim 20, wherein the request handling means records, to the database in association with each other, a user identifier for identifying a user having provided or acquired information, date of the information handling, information identifier for identifying information having been provided to the user, data type identifier indicating a type of information having been acquired, and an operation identifier for identifying for which the mode of information handling operation is, information provision or acquisition, as information included in the information handling history.

* * * * *